United States Patent [19]
Hoshi

[11] Patent Number: 5,658,601
[45] Date of Patent: Aug. 19, 1997

[54] MACHINE FOR CUTTING STRAND

[75] Inventor: Tadaichi Hoshi, Tochigi-ken, Japan

[73] Assignee: Kabushiki Kaisha Hoshi Plastic, Tochigi-ken, Japan

[21] Appl. No.: 507,454

[22] PCT Filed: Dec. 28, 1993

[86] PCT No.: PCT/JP93/01928

§ 371 Date: Jan. 4, 1996

§ 102(e) Date: Jan. 4, 1996

[87] PCT Pub. No.: WO94/20275

PCT Pub. Date: Sep. 15, 1995

[30] Foreign Application Priority Data

Mar. 2, 1993 [JP] Japan .................... 5-041116

[51] Int. Cl.⁶ .................................................. B29B 9/02
[52] U.S. Cl. .................... 425/289; 425/301; 425/315; 425/316; 264/143; 83/349; 83/675; 83/698.51
[58] Field of Search ...................... 425/315, 316, 425/72.1; 264/143; 83/675, 698.51, 349

[56] References Cited

U.S. PATENT DOCUMENTS

| | | | |
|---|---|---|---|
| 1,244,171 | 10/1917 | Bullock | 83/698.51 |
| 4,290,996 | 9/1981 | Hayashi et al. | 425/387.1 |
| 4,528,157 | 7/1985 | Lettner et al. | 264/143 |
| 5,118,270 | 6/1992 | Keilert et al. | 425/72.1 |
| 5,165,319 | 11/1992 | Snyder et al. | 83/675 |
| 5,182,115 | 1/1993 | Nogossek et al. | 264/143 |
| 5,186,959 | 2/1993 | Tanaka | 425/315 |
| 5,191,819 | 3/1993 | Hoshi | 83/349 |
| 5,474,435 | 12/1995 | Hunke | 264/143 |

FOREIGN PATENT DOCUMENTS

| | | | |
|---|---|---|---|
| 54-36938 | 11/1979 | Japan . | |
| 58-84211 | 6/1983 | Japan . | |
| 51(61)90507 | 6/1986 | Japan . | |
| 61-148006 | 7/1986 | Japan . | |
| 6220259 | 5/1987 | Japan . | |
| 62162508 | 7/1987 | Japan . | |
| 633776 | 1/1988 | Japan . | |
| 63-216710 | 9/1988 | Japan . | |
| 3-34445 | 5/1991 | Japan . | |
| 460213 | 3/1992 | Japan . | |
| 4-226303 | 8/1992 | Japan . | |
| 4-506493 | 11/1992 | Japan . | |
| 5345317 | 12/1993 | Japan | 264/143 |

Primary Examiner—Jay H. Woo
Assistant Examiner—Iurie A. Schwartz
Attorney, Agent, or Firm—Antonelli, Terry, Stout & Kraus, LLP

[57] ABSTRACT

A strand cutting machine at least includes a rotary blade assembly (A) having a plurality of rotary blades, a stationary blade unit (B) having a guide portion (7) for guiding strands toward the rotary blade in an axial direction of a rotary shaft of the rotary blades and a take up roller (1, 2) disposed on the side of the base end of the guide portion for taking up the strands and further includes a housing for accommodating the above mentioned components. Each rotary blade is comprised of a blade plate (5) having a blade edge at one end thereof. Each blade plate has its blade edge which is the closest to the stationary blade and is located on the same rotary plane and is disposed on and around the rotary shaft while the blade plate is retracted far from the stationary blade in a direction from the blade edge to the base end thereof.

31 Claims, 23 Drawing Sheets

MACHINE FOR CUTTING STRAND

TECHNICAL FIELD

The present invention relates to an apparatus for cutting strands which are linear material made of synthetic resin, glass and the like, and in particular to a strand cutting machine which is capable of smoothly cutting strands having various properties ranging from hard to soft properties with high precision, and a method of operating the same.

BACKGROUND TECHNOLOGY

There have been strand cutting machines which produce finely cut materials such as pellets by cutting strands made of synthetic resin and the like which are linear in shape.

One example of this type of strand cutting machine is disclosed in Japanese Unexamined Published Application No. Tokkai Hei 4-226303 (Patent Application No. Hei 3-95089) filed by the present inventor. This strand cutting machine comprises a rotary blade assembly having a plurality of rotary blades which are radially arranged on a rotary plane, a stationary blade unit having a stationary blade which is disposed in front of the rotary plane of the rotary blades and a guide portion for guiding the front ends of the strands in an axial direction of a rotary shaft of the rotary blades; and a take up roller which takes up the strands in front of the guide portion.

The strand cutting machine is capable of cutting the strands on a plane which is parallel with the rotary plane of the blades since it conveys the strands in an axial direction of the rotary shaft. Accordingly, it is capable of smoothly cutting the strands.

However, since the face of the rotary blade on the side of the stationary blade is located on the same rotary plane of the blade edges of the rotary blades, it has a large area which is in contact with the strands and it wipes and abrades the cut areas of the strands. Accordingly an additional force is necessary to perform cutting.

The strands to be cut have various properties such as hard and soft properties depending upon the material. It is difficult for the strand cutting machine to cut the strands having some properties. A problem will arise that conveying of the strands can be smoothly achieved due to the fact that the strands are low in rigidity, but are more liable to become stuck to the surface of a member constituting a conveying path when the strands have softer properties. Since the soft strands are liable to stick to a rotary blade immediately after being cut, rotation of the strands stuck to the rotary blade is liable to occur. Accordingly, a problem will arise that the strands stuck to the rotary blade are cut again. This causes cut strands which are smaller in size than those of the specified cut strands to be mixed with the normally cut strands, resulting in reduction in precision of products.

This phenomenon is more liable to occur as the contact area between the rotary blade and the strands become larger. Adhesion of resin and the like upon the rotary blade is liable to occur when the contact area between the rotary blade and the strands becomes larger. As a result, a problem will arise that the surface of the blade is liable to become contaminated with foreign material.

The strands having a low rigidity will be bent, or undulated when they are urged toward the rotary blade and are unable to advance in a direction normal to the rotary blade. This causes a problem that the cut section is inclined.

When strands made of hard material such as glass are cut, needle-like finely divided fragments may be scattered. If the scattered finely divided fragments become suspended in air, they will have a harmful effect on a human body which inhales them. Therefore, it is preferable to cut such type of strands at a temperature which is as high as possible, and at which less finely divided fragments will be scattered.

However, since cutting at a high temperature will soften hard material, a problem similar to the above mentioned case of soft material will arise.

DISCLOSURE OF THE INVENTION

It is an object of the present invention to provide a strand cutting machine which is capable of smoothly cutting strands having various properties ranging from soft to hard properties with high precision, and a method of operating the same.

It is another object of the present invention to provide a method of cutting strands which is capable of smoothly cutting strands having properties ranging from soft to hard properties.

In order to accomplish the above mentioned object, in a first aspect of the present invention there is provided a strand cutting machine for cutting at least one strand, which is formed in linear form, comprising a rotary blade assembly having a rotary shaft and a plurality of rotary blades which are radially disposed on and around the rotary shaft;

a stationary blade unit adjacent to the rotary blade assembly, having a guide portion for guiding the strand toward the rotary blades in an axial direction of the rotary shaft of the rotary blade assembly and a stationary blade which is disposed in front of the guide portion;

a take-up roller disposed on the side of the base end of the guide portion for taking up the strand;

a rotary blade assembly drive unit for driving the rotary blade assembly;

a take up roller drive unit for driving the take up roller; and a housing for accommodating therein the rotary blade assembly, the stationary blade unit, the take up roller, and the rotary blade assembly and the take up roller drive unit; assembly.

In order to accomplish the above mentioned object, in a second aspect of the present invention there is provided a strand cutting machine for cutting at least one strand which is linearly formed, comprising at least:

a rotary blade assembly having a rotary shaft by which it is driven around and a plurality of rotary blades which are radially disposed on and around the rotary shaft;

a stationary blade unit adjacent to the rotary blade assembly, having a guide portion for guiding the strand toward the rotary blades in an axial direction of the rotary shaft of the rotary blade assembly and a stationary blade which is disposed in front of the guide portion;

in which the rotary blade assembly further includes, radially disposed on and around the rotary shaft, a plurality of rotary blade supporting portions for supporting the rotary blades and a link for reinforcing the rotary blade supporting portions by linking them to each other;

the link being in the form of ring and having an inner diameter which becomes larger in a direction remote from the rotary blades.

In order to accomplish the above mentioned object, in a third aspect of the present invention there is provided a strand cutting machine for cutting at least one strand which is linearly formed including:

a rotary blade assembly having a rotary shaft and a plurality of rotary blades which are radially disposed on and around the rotary shaft so that they are on the same rotary plane;

a stationary blade unit adjacent to the rotary blade assembly, having a guide portion for guiding the strand toward the rotary blades in an axial direction of the rotary shaft of the rotary blade assembly and a stationary blade which is disposed in front of the guide portion;

a take-up roller disposed on the side of the base end of the guide portion for taking up the strand;

a rotary blade assembly drive unit for driving the rotary blade assembly; and a take up roller drive unit for driving the take up roller;

the rotary blade assembly including a first bearing on the side of one end of the rotary shaft of the rotary blade assembly for bearing the rotary shaft while it is not axially movable and a second bearing on the side of the other end of the rotary shaft for bearing the rotary shaft while it is axially movable.

In order to accomplish the above mentioned object, in a fourth aspect of the present invention there is provided a strand cutting machine for cutting at least one strand which is linearly formed comprising:

a rotary blade assembly having a rotary shaft and a plurality of rotary blades which are radially disposed on and around the rotary shaft so that they are on the same rotary plane;

a stationary blade unit adjacent to the rotary blade assembly, having a guide portion for guiding the strand toward the rotary blades in an axial direction of the rotary shaft of the rotary blade assembly and a stationary blade which is disposed in front of the guide portion;

a take-up roller disposed on the side of the base end of the guide portion for taking up the strand;

a rotary blade assembly drive unit for driving the rotary blade assembly; and a take up roller drive unit for driving the take up roller;

in which the guide portion is provided on the bottom thereof with a plurality of grooves for guiding the strands, each groove has a width which is smaller than the width of the strands.

In order to accomplish the above mentioned object, in a fifth aspect of the present invention there is provided a strand cutting machine for cutting at least one strand which is linearly formed comprising:

a rotary blade assembly having a rotary shaft and a plurality of rotary blades which are radially disposed on and around the rotary shaft so that they are on the same rotary plane;

a stationary blade unit adjacent to the rotary blade assembly, having a guide portion for guiding the strand toward the rotary blades in an axial direction of the rotary shaft of the rotary blade assembly and a stationary blade which is disposed in front of the guide portion;

a take-up roller disposed on the side of the base end of the guide portion for taking up the strand;

a rotary blade assembly drive unit for driving the rotary blade assembly; and a take up roller drive unit for driving the take up roller;

in which each of the rotary blades is constituted of a blade plate each having a blade edge on one end thereof;

each blade plate being radially disposed around the rotary shaft in a condition where an edge formed by the blade edges are in the closest proximity of the stationary blade to be located on the same virtual rotary plane and the portions other than the edge being in a condition retreated from the stationary blade in a direction away from the blade edge to form an acute angle between the virtual plane.

In the present invention the strands are conveyed in an axial direction of the rotary shaft of the rotary blades. Accordingly, the position of the blade edge of the rotary blade with respect to the cut section of the strands does not change from that at the lower portion thereof. Hence, since the force imparted to the strands by the blade edge does not vary depending upon the cutting depth, the strands can be smoothly cut.

Due to the fact that the portion of the rotary blade other than the blade edge is retracted from the stationary blade, it is only the blade edge of the rotary blade that is in contact with the cut section of the strands which remains on the stationary blade.

Since the rotary blade does not unnecessarily contact with the strands, useless force resulting from the contact friction is eliminated. Since the contact area is small, sticking of soft material or the like to the rotary blade is less liable to occur. As a result, the surface of the blade is less liable to be contaminated. The phenomenon where the fragments (pellets) of the cut strands which are stuck to the rotary blade and are rotated together therewith reach the stationary blade and are cut again can be prevented from occurring.

In accordance with the present invention, the strands are supplied to the rotary blades so that the level of the position in which the strands are cut by the rotary blade is constantly lower than the level of the position in which the strands are conveyed from the take up roller. This causes even soft strands to be smoothly advanced by such inclination. Accordingly, resistance to the conveying of the strands from the take up roller on the front end becomes less so that buckling undulating, etc. are less liable to occur. As a result, the cut section of the strands is prevented from inclining since the strands advance substantially perpendicularly to the rotary blade.

The above mentioned counter measure for the soft strands makes it possible to cut the strands which will scatter the finely divided fragments on cutting after they have been heated to be softened. Of course, it makes it possible to cut at high temperature the strands which will not scatter the finely divided fragments on cutting.

BEST MODE FOR EMBODYING THE INVENTION

Now, an embodiment of the present invention will be described with reference to the drawings.

Figure 1:
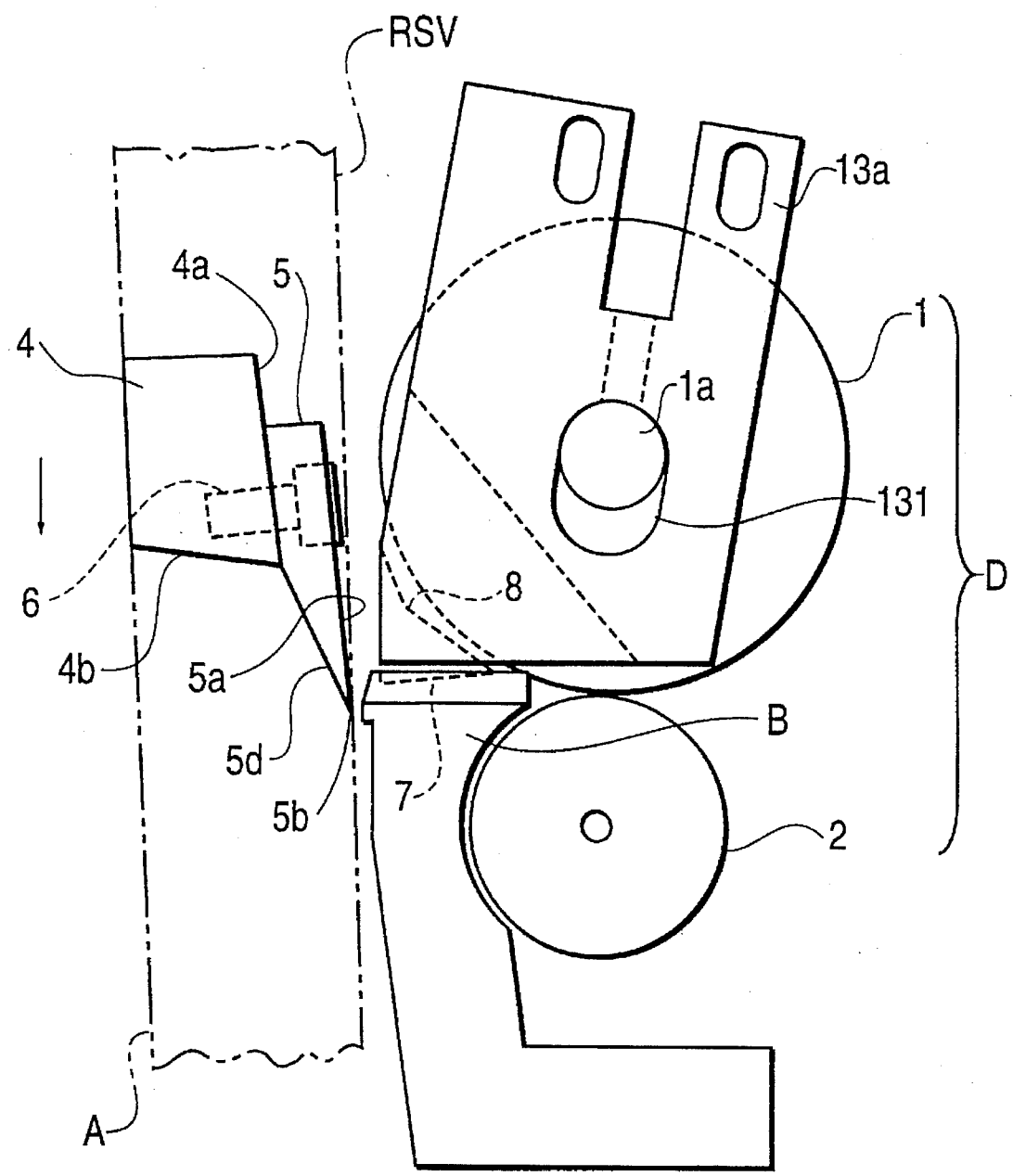
FIG. 1 is a side view showing main parts of an embodiment of the present invention.
Figure 14:
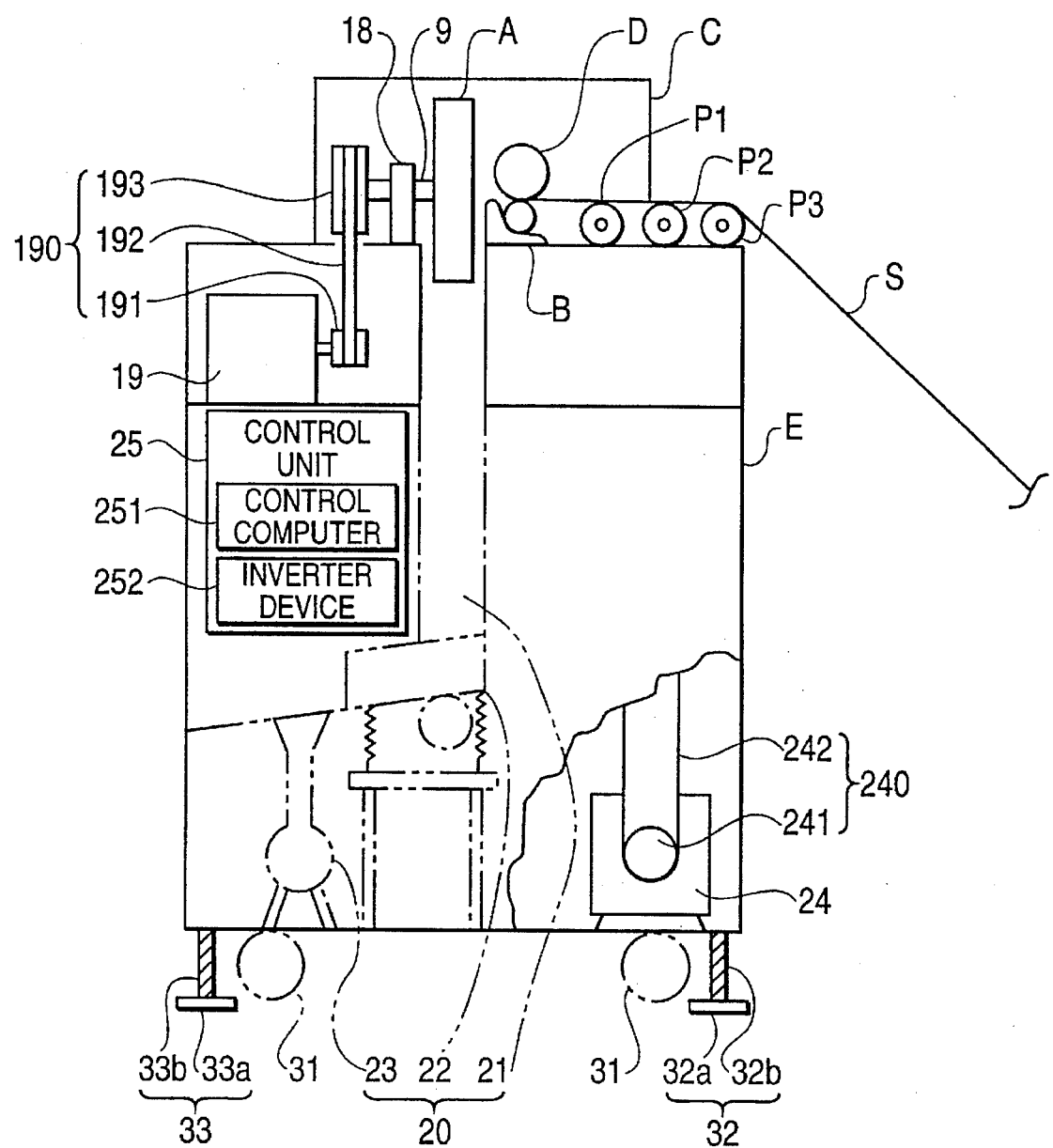
FIG. 14 is a side view showing the outline of the entire strand cutting machine in the foregoing embodiment.

The structure of a strand cutting machine which is an embodiment of the present invention is shown in FIGS. 1 and 14.

As shown in FIG. 14, the cutting machine of the present embodiment includes a rotary blade assembly A and a stationary blade unit B which are provided for cutting strands S, the rotary blade assembly A and stationary blade unit B, a covering C for covering the assembly A, the unit B, the rollers D and a housing E in which the above mentioned components are accommodated.

The rotary blade assembly A and the take-up rollers D are disposed so that they sandwich the stationary blade unit B therebetween (refer to FIG. 1). These components are positioned in the upper portion of the housing E. The rotary blade assembly A is positioned with respect to the stationary blade unit B so that strands are directed in an axial direction of a rotary shaft 9 of the rotary blade assembly A. The strands S are conveyed from the side of the take-up rollers D through the stationary blade unit B so that the strands S are moved into the rotary blade assembly A from the front ends of the strands are then cut by the assembly A.

Pulleys P1, P2 and P3 are disposed on the entrance (upstream) side of the take up rollers D for guiding the strands S toward the take up rollers D. Although only one strand S is shown in the embodiment of FIG. 14, a plurality of strands S which are in parallel with each other are actually conveyed by the take up rollers D. The strands S are formed at the previous stage of the cutting machine and are continuously supplied.

The covering C covers the above mentioned components. Although not illustrated, the covering C is provided with a hinge on one side which is parallel with the rotary shaft of the assembly A so that it can be opened or closed.

A motor 19 and a power transmission mechanism 190 are provided within the housing E for driving the rotary blade assembly A to rotate. The power transmission mechanism 190 comprises a pulley 191 for taking up the torque of the motor 19, a pulley 193 mounted on the rotary shaft (main shaft) 9 of the rotary blade assembly A and a belt 192 which is wound on the pulleys 191 and 193 and is tensioned therebetween for transmitting the torque of the pulley 191 to the pulley 193. Rotation of the motor 19 will cause the rotary blade assembly A to rotate.

A motor 24 and a power transmission mechanism 240 are provided within the housing E for driving the take up rollers D to rotate. The power transmission mechanism 240 comprises a pulley 241 mounted on the motor 24, a pulley mounted on the rotary shaft of the take up rollers D (not shown) and a belt 242 tensioned therebetween. Rotation of the motor 24 will cause the take up rollers D to rotate.

A pellet treating unit 20 for treating the finely cut strands (pellets) and a control unit 25 for controlling the present cutting machine, etc. are also housed in the housing E.

The pellet treating unit 20 comprises a pellet falling path 21 below the rotary blade assembly A, through which cut pellets fall, a sieve unit 22 below the path 21 and a pneumatic conveying unit 23 for pneumatically conveying the pellets under pressure. The pellet treating unit 20 is not limited to only the illustrated structure. For example, it may comprise only a tank and a chute for discharging the pellets in the tank.

The control unit 25 comprises, for example, a control computer 251 and an inverter device 252 for each motor which is controlled by the computer 251.

The motor 19 is inverter-controlled by the control unit 25 so that the rotational speed, etc. are controlled. Similarly, the motor 24 is also inverter-controlled by the control unit 25 so that the rotational speed, etc. are controlled. The rotational speed of the motor 19 is determined based upon the period of time (cutting period) which is taken for each rotary blade of the rotary blade assembly A to successively reach the stationary blade. The rotational speed of the motor 24 is determined based upon the supply speed of the strands from the take up rollers D. In other words, the cutting period and the supply speed are determined based upon the length of cut pellets and the cutting rate of the strands per unit time. Specifically, they can be determined by inputting these values into the computer 251 and by causing the computer to operate on them.

Four casters 31 (only two of them are shown in FIG. 14) for carrying the machine per se and two pairs of adjusters 32 and 33 for fixing of the machine and adjusting of the height thereof are provided on the outer side of the bottom of the housing E. The adjusters 32 and 33 can be used not only for fixing the machine, but also for adjusting the inclination of the machine for making it possible to perform conveying and cutting of the strands while the whole of the machine is inclined. In the present embodiment, the adjusters 32 and 33 comprise foot plates 32a and 33a and bolt portions 32b and 33b secured thereto, respectively. The bolt portions 32b and 33b are threaded into the threaded holes (not shown) formed in the bottom of the housing E.

Figure 2:
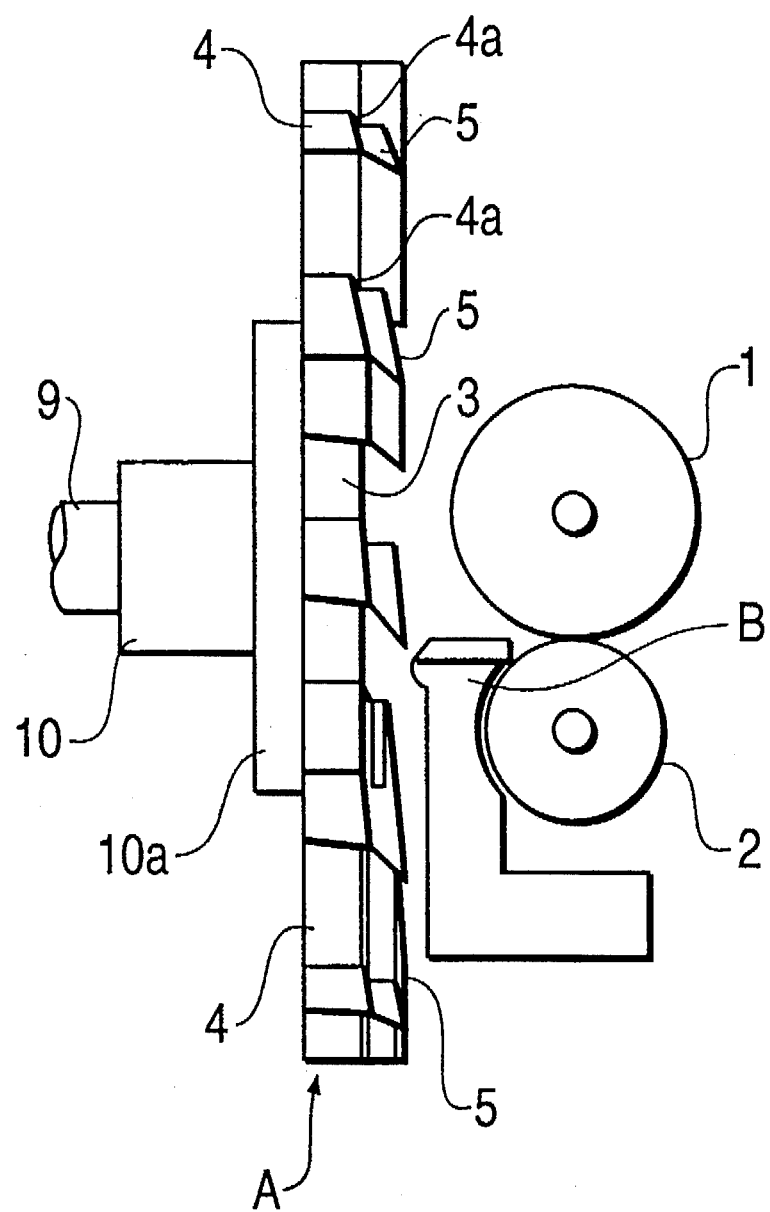
FIG. 2 is a side view showing part of the strand cutting machine of the present embodiment.
Figure 3:
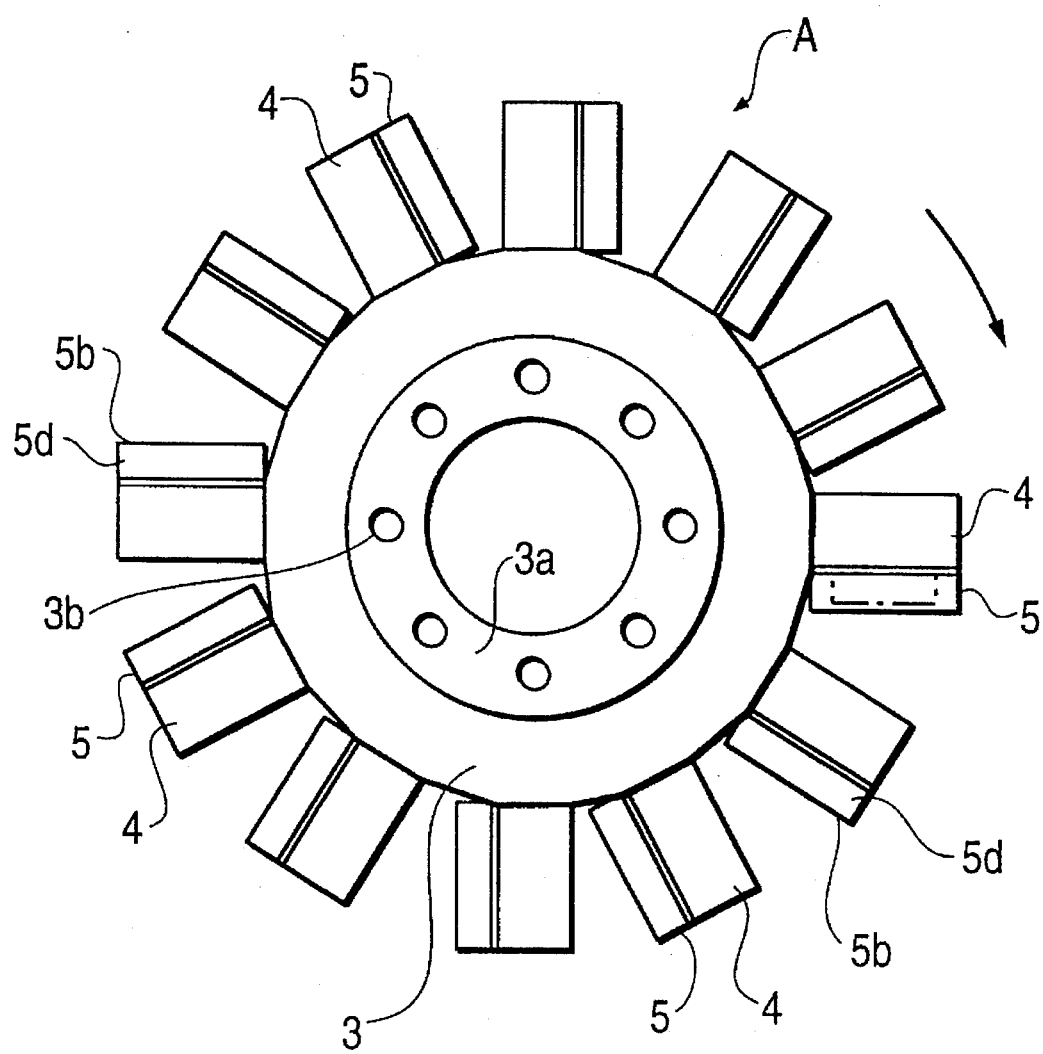
FIG. 3 is a rear view showing the left side of the part of the cutting machine shown in FIG. 2.

The rotary blade assembly A include the rotary shaft 9 and a plurality of rotary blades 5 which are radially disposed on the same rotary plane around the rotary shaft 9 as shown in FIGS. 2 and 3. Although twelve rotary blades 5 are provided in the present embodiment, they are not limited to only 12. For example, 24 blades may be provided.

Specifically, the rotary blade assembly A comprises the rotary shaft 9, a rotary disc 3 into which the outer periphery of the rotary shaft 9 is fitted at one end thereof, 12 protuberances 4 (rotary blade supporting portions) which are radially disposed at equal spaces on the outer periphery of the rotary disc 3, a boss 10 into which the end of the rotary shaft 9 is fitted and the rotary blades (blade plates) secured to the rotary blade supporting portions 4 as mentioned above.

The rotary disc 3 is provided with an annular recess 3a on the rear side thereof as shown in FIG. 3. The recess 3a is provided with 8 through-holes 3b. A flange 10a of the boss 10 is fitted into the recess 3a. The flange 10a is secured to the rotary disc 3 by eight bolts 3c (refer to FIG. 4) which are inserted into the through holes 8b from the front side of the disc 3.

Figure 4:
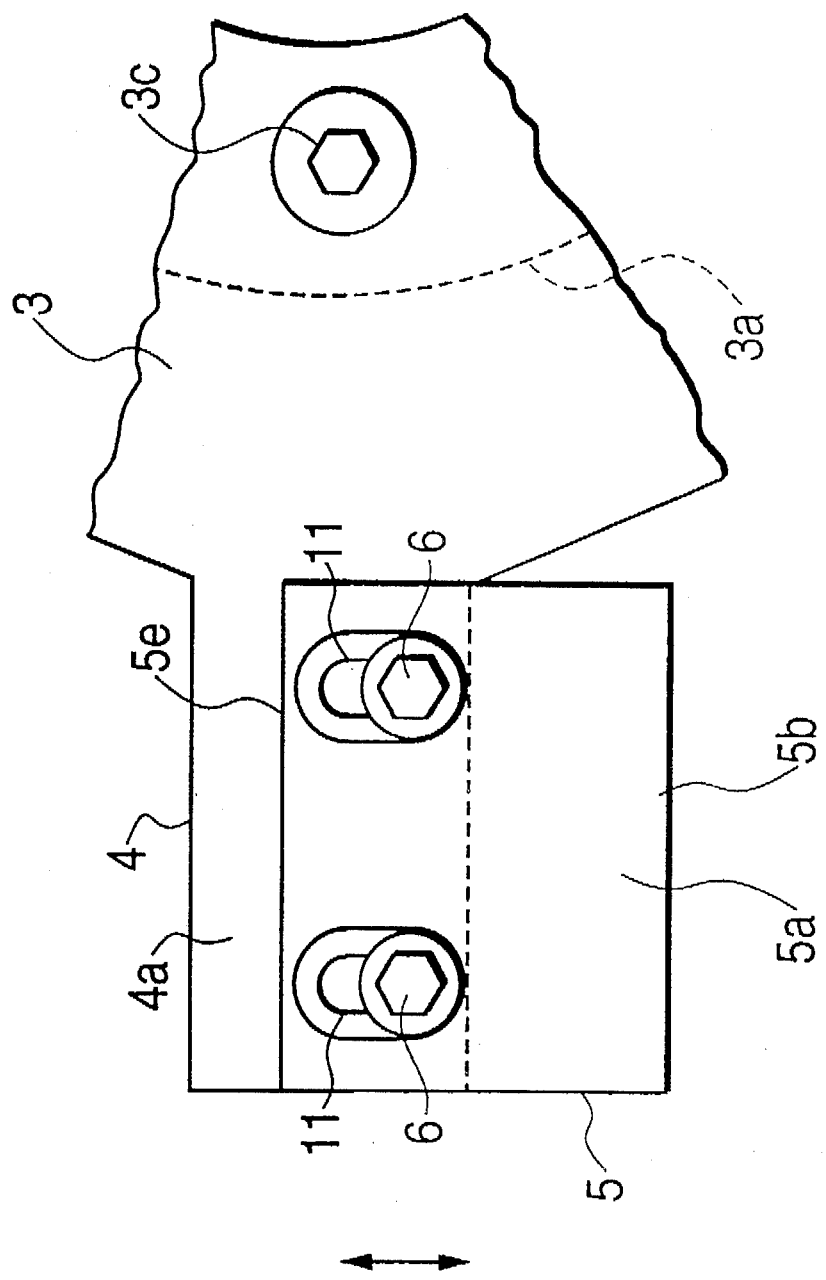
FIG. 4 is an elevational view showing the rear side of the part of the strand cutting machine shown in FIG. 3.

Each rotary blade 5 is mounted on the front side 4a of the corresponding rotary blade supporting portion 4, which faces to the stationary blade unit B (refer to FIGS. 1, 2 and 4).

Figure 5:
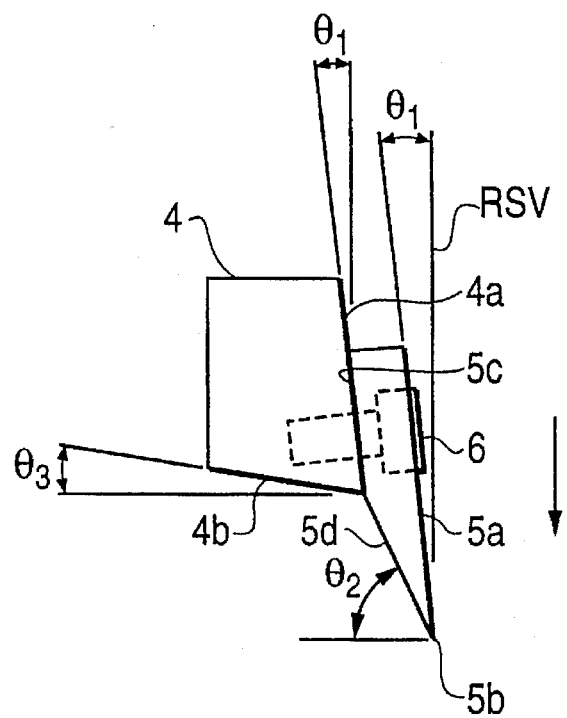
FIG. 5 is a side view showing the part of FIG. 1.
Figure 6:
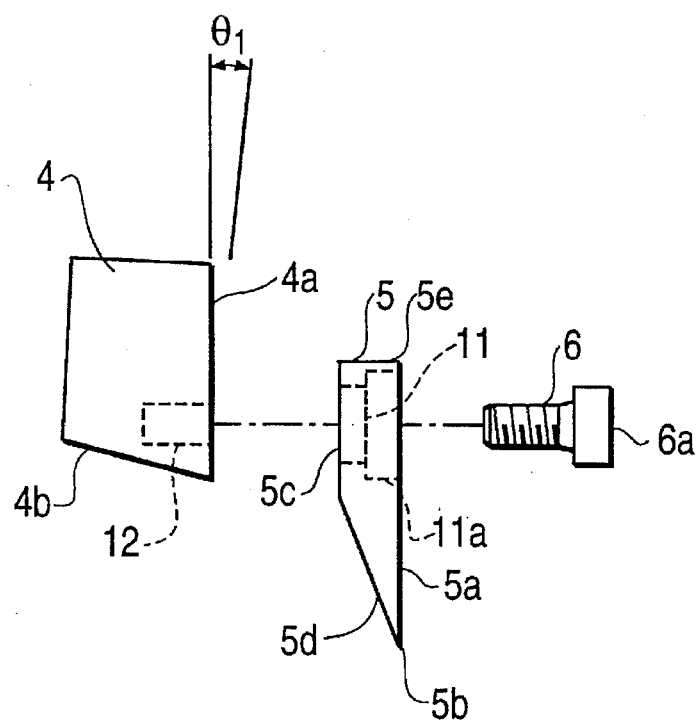
FIG. 6 is a side view showing exploded components shown in FIG. 5.

Each rotary blade 5 comprises a blade plate as shown in FIGS. 4, 5 and 6. The rotary blade 5 (hereinafter also referred to as blade plate) has a blade edge 5b at one end thereof. The blade plate 5 is formed on the rear side thereof with blade edge face 5d by cutting the blade plate 5 in a tapered manner.

Each blade plate 5 is inclinedly mounted on the rotary blade supporting portion 4 in such a manner that the face extending from the blade edge to the base end forms a retracted angle with respect to a virtual rotary surface RSv which is traced by the rotation of the blade edge of the rotary blade as shown in FIGS. 5 and 6. Actually that front side 4a of the rotary blade supporting portion 4 is inclinedly formed at a retracted angle $\theta$, with respect to the virtual rotary surface RSV. The retracted angle $\theta_1$ may be, for example, about 5 degrees.

The blade edge face 5d is provided in such a manner that it forms an inclination angle $\theta_2$ with respect to a plane normal to the rotary surface RSV including the line of the blade edge 5b. The inclination angle $\theta_2$ may be, for example, 50 to 65 degrees.

The surface 4b which faces in a rotational direction of the rotary blade supporting portion 4 is formed at a low angle $\theta_3$ with respect to a plane normal to the rotary surface RSV including the line of the blade edge 5b as shown in FIG. 5.

The plate 5 is formed with 2 elongated holes 11 (slit holes) extending from the blade edge 5b to the base end 5e thereof for mounting of the blade plate 5 as shown in FIGS. 4 and 6. Each of the elongated holes 11 is provided with an opening 11a in which a head 6a of the bolt 6 which will be described hereafter is accommodated. Two thread holes 12 into which the threaded bolts 6 are screwed are formed on the front side 4a of the rotary blade supporting portion 4 corresponding to the elongated holes.

The blade plate 5 is mounted on the rotary blade supporting portion 4 by abutting the rear side 5c of the blade plate 5 on the front side 4a of the rotary blade supporting portion 4 and by screwing both bolts 6 from the front side both bolts 6 into both threaded holes 12 formed in the rotary blade supporting portion 4 normally to the front side 4a. At this time, the blade edge 5b is aligned with the virtual rotational surface RSV by shifting the blade plate 5 in an arrow direction in FIG. 4.

Figure 15A:
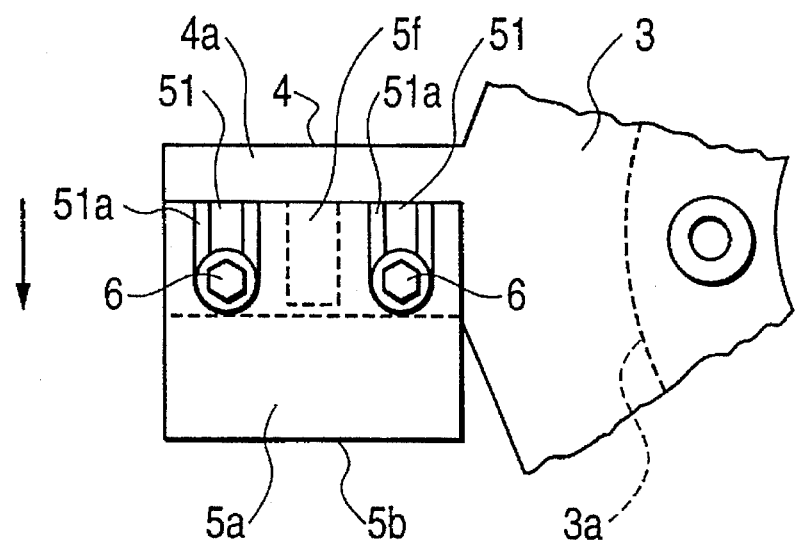
FIG. 15A is a front view showing another example of the rotary blade (blade plate)

The elongated holes may be replaced with notches 51 as shown in FIG. 15A. These notches 51 will make it possible to adjust the position of the blade edge 5b of the blade plate 5 or to remove the blade plate 5, while the bolts 6 are screwed in the threaded holes 12.

In this case, an opening 51a is also provided in which the head 6a of the bolt 6 is accommodated. This prevents the head 6a of the bolt 6 from protruding therefrom.

Figure 15B:
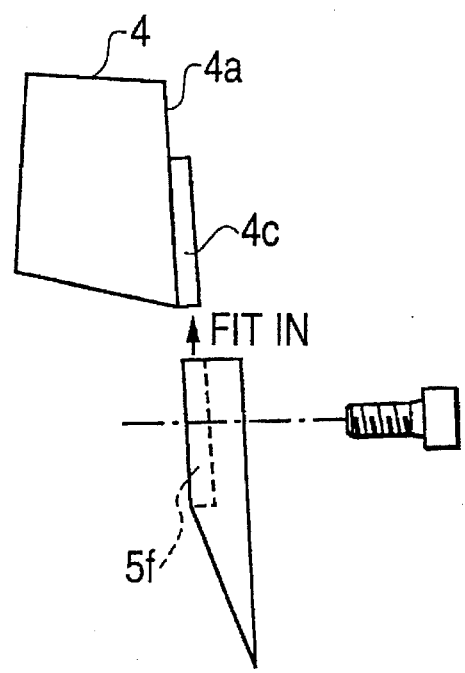
FIG. 15B is an explanatory view showing another example of the rotary blade (blade plate)

Positioning of the blade plate in a radial direction of the rotary blade assembly A can be made easier by providing a positioning projection 4c on the front side 4a of the rotary blade supporting portion 4 and providing a recess 5f on the rear side of the blade plate 5 and fitting the projection 4c into the recess 5f as shown in FIG. 15B.

Figure 16:
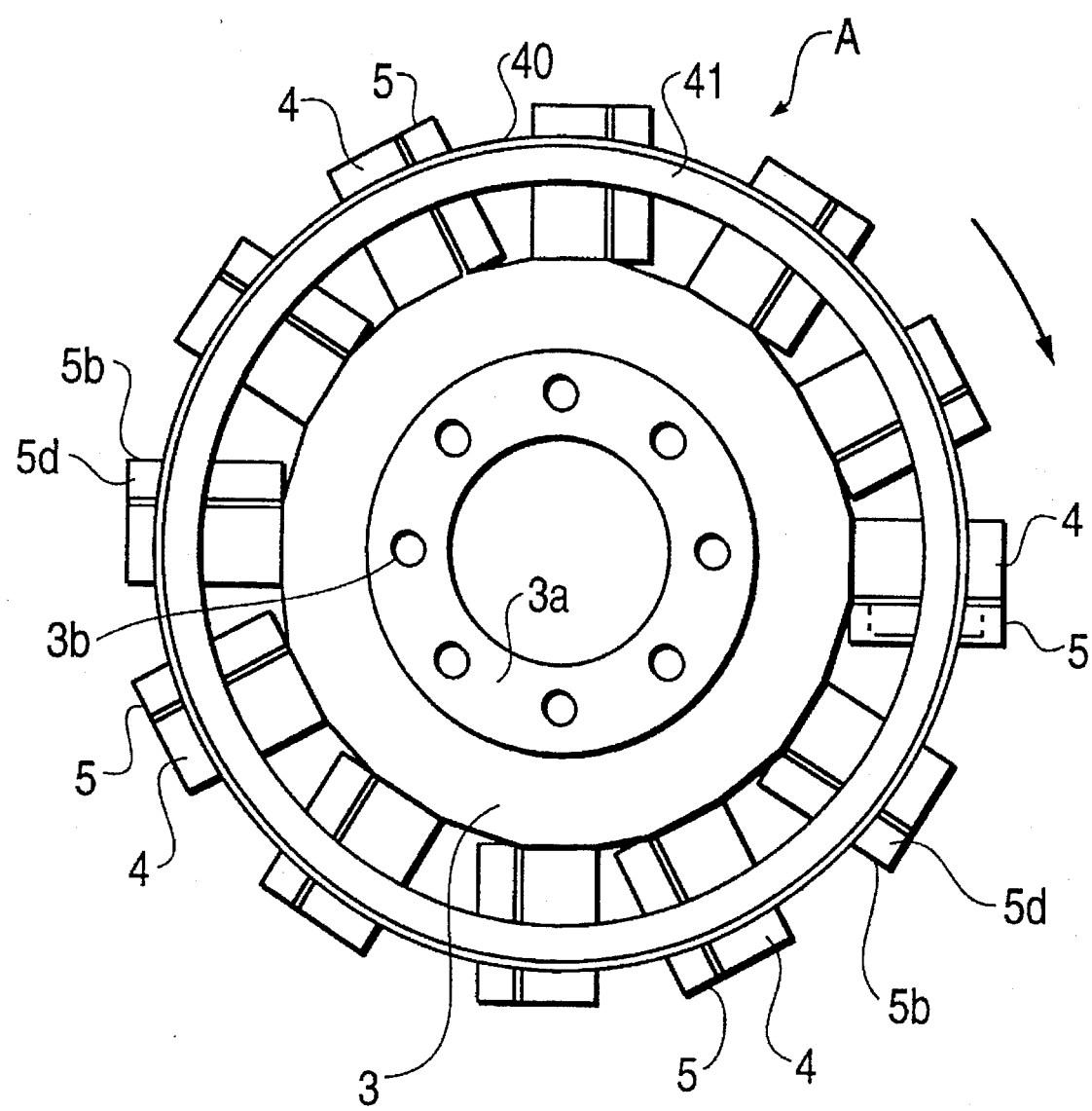
FIG. 16 is a rear view showing the reinforcement of the rotary blades in the rotary blade assembly in the foregoing embodiment.
Figure 17:
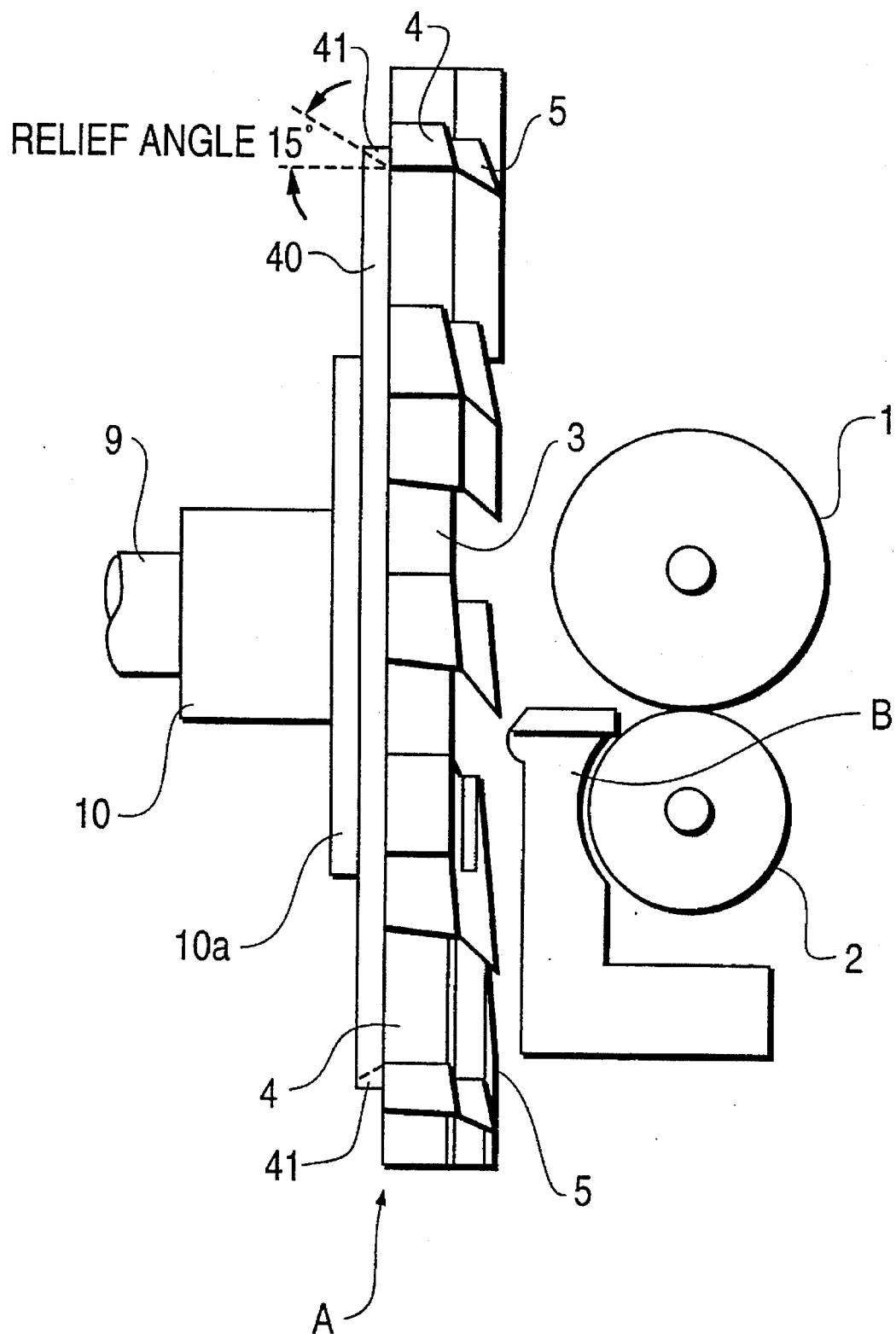
FIG. 17 is a side view of FIG. 16.

Displacement of the rotary blade may occur when it is subjected to a large force such as when cutting hard strands. In order to prevent this, a reinforcing link 40 may be mounted on the rear side of the rotary blade supporting portion 4 as shown in FIGS. 16 and 17.

The reinforcing link 40 is provided with such a taper 41 on the inner periphery thereof that the inner diameter becomes larger toward the rear side of the link 40. The taper, for example, is formed so that the relief is 15 degrees as shown in FIG. 17. The taper will act so that the link 40 will not obstruct the rearward movement of the strands which have been cut by the rotary blades 5.

Figure 7:
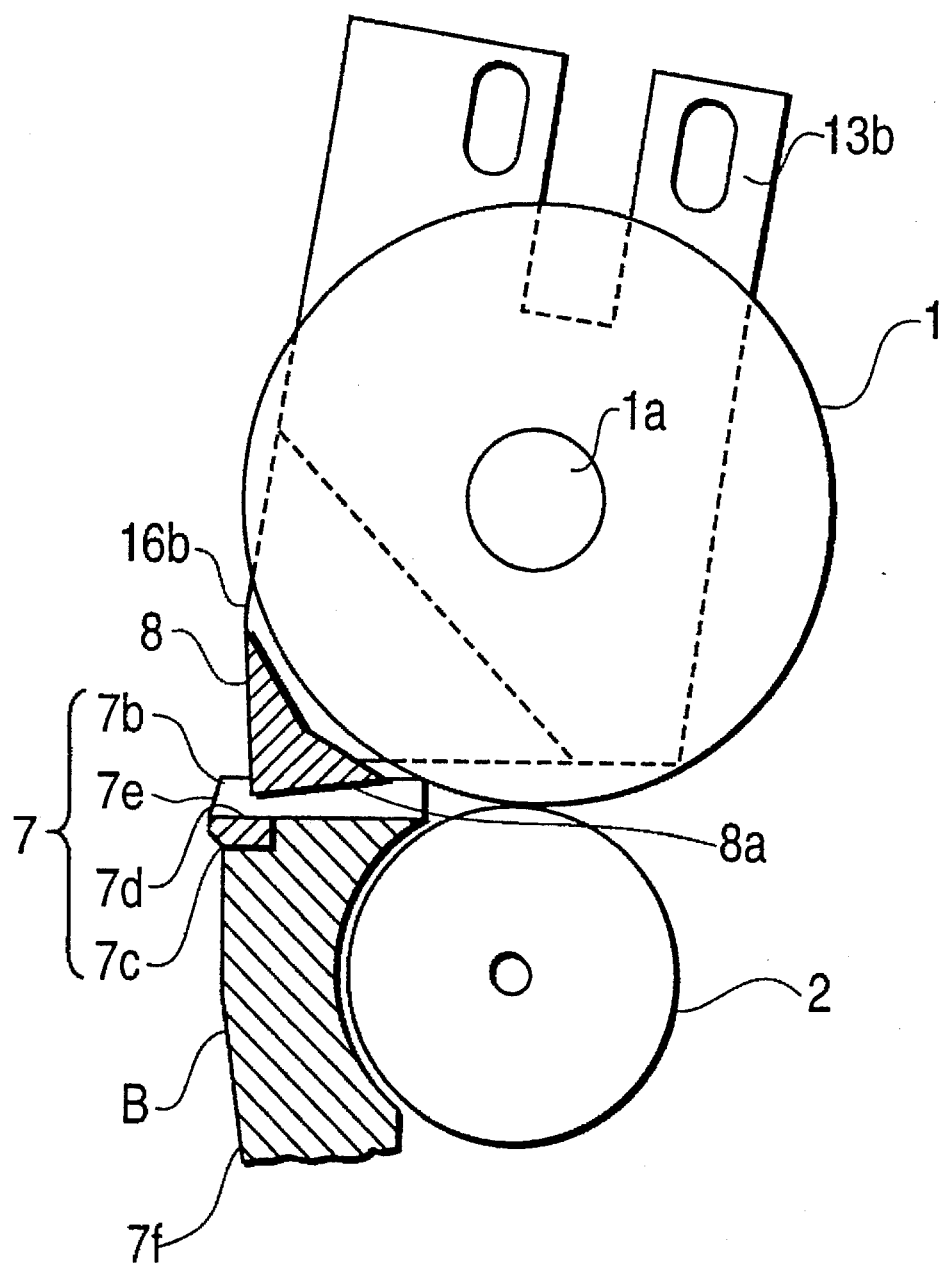
FIG. 7 is a partly sectional and elevational view showing the part of the cutting machine shown in FIG. 1.
Figure 8:
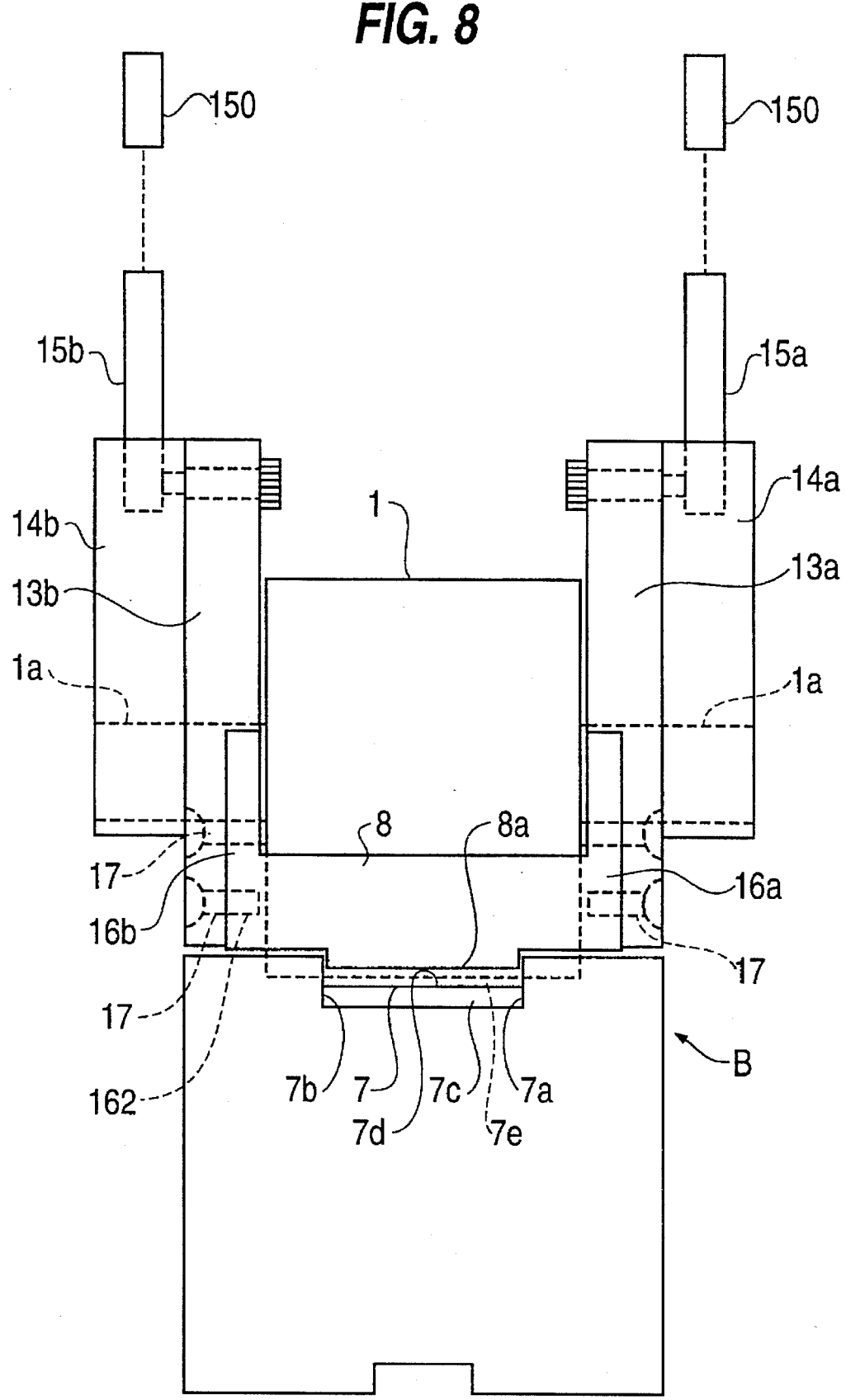
FIG. 8 is a rear view showing the left side of the part of the cutting machine shown in FIG. 1.
Figure 9A:
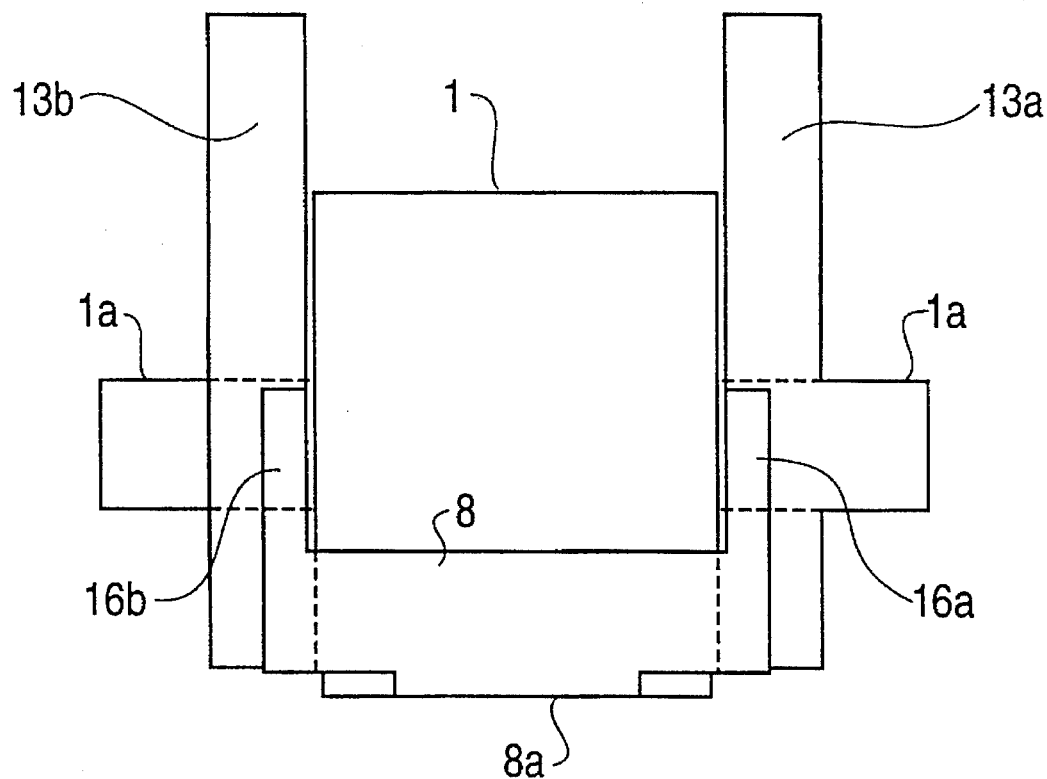
FIG. 9A is a rear view showing the upper side of the exploded components of the cutting machine shown in FIG. 8.
Figure 9B:
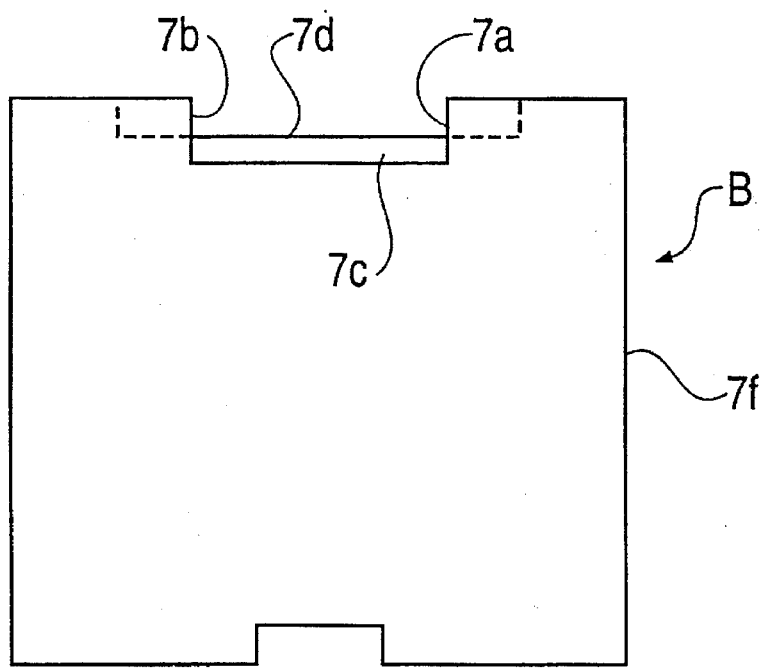
FIG. 9B is a rear view showing the lower side of the exploded components of the cutting machine shown in FIG. 8.
Figure 10:
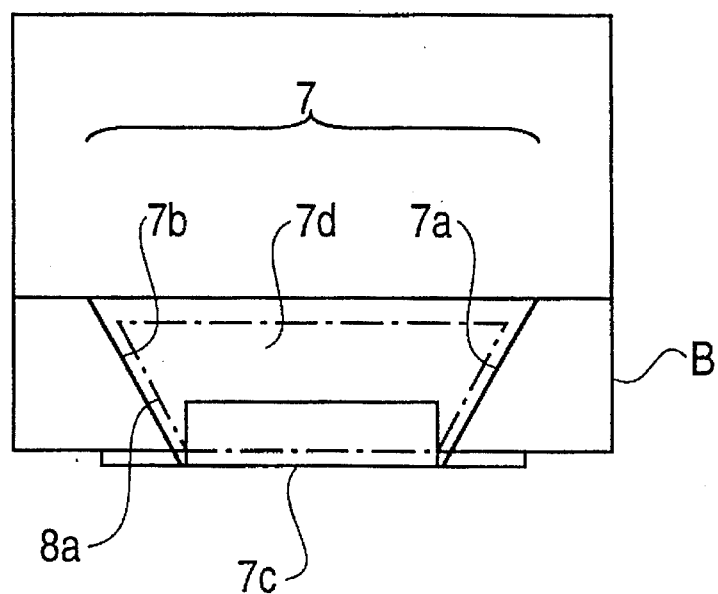
FIG. 10 is a plan view showing a stationary blade unit.
Figure 11:
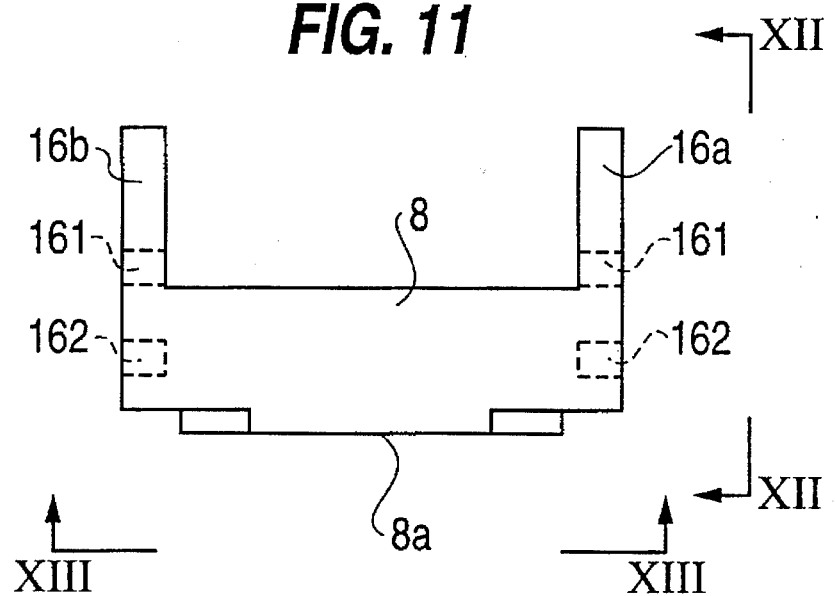
FIG. 11 is a rear view showing a leap preventing plate.
Figure 12:
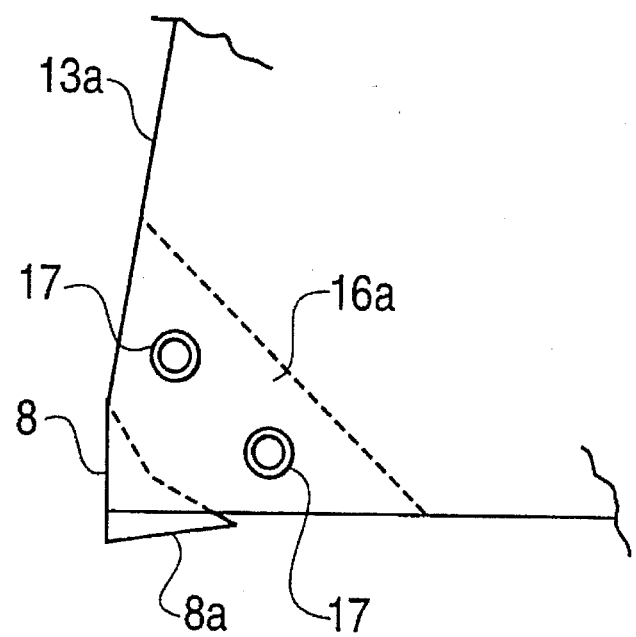
FIG. 12 is a side view as viewed from a line XII—XII in FIG. 11.
Figure 13:
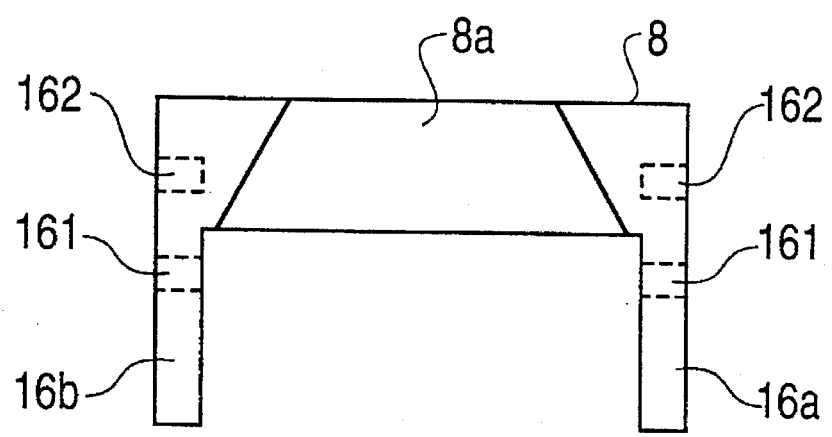
FIG. 13 is a bottom view as viewed from a line XIII—XIII in FIG. 11.

The stationary blade unit B includes a guide portion 7e for guiding the strands S toward the rotary blades 5 in an axial direction of the rotary shaft 9 of the rotary blade 5, a stationary blade 7c positioned at the front end of the guide portion 7e and a platen 7f for supporting them as shown in FIGS. 7, 9B and 10.

The guide portion 7e has both guide sides 7a and 7b and a bottom side 7d therebetween so that the guide portion 7e is in the form of a recess. The depth of the guide sides 7a and 7b is, for example, about double the diameter of the strands to be cut and may be, for example, 1 to 4 min. It is usually about 2 mm. The width of the bottom side 7d is preset to such a width that, for example, about ten strands can be spaced next to each other in a parallel relationship. The depth of the bottom in the position of the stationary blade 7c may be about 10 to 15 mm. The width of the bottom side corresponds to the width of the rotary blade 5. The bottom side 7d and both guide sides 7a and 7b are coated with a protective coating over the entire surface thereof. In the present embodiment, the protective coating is made of hardened chrome. This coating is applied to protect the bottom side 7d and both guide sides 7a and 7b from rusting and to cause the strands to slide well.

Both guide sides 7a and 7b are formed so that the distance therebetween becomes smaller toward the rotary blade assembly A as shown in FIG. 10. This has the effect of smoothly converging the diverged strands so that they will abut on the rotary blade perpendicularly thereto. This prevents the cut sections of the strands from becoming inclined.

The guide portion 7e is formed with the stationary blade 7c at the front end thereof. The stationary blade 7c is made with a super hard tip. The distance between the front end of the stationary blade 7c and an interface between the stationary blade 7c and the bottom 7d of the guide portion 7e is preset to, for example, about 1 to 5 mm. For example, it is usually preset to about 3 mm.

The bottom side 7d is formed with a multiplicity of grooves 70 extending in a direction of the flow of the strands. The grooves 70 each have a width and a depth which are smaller than the diameter of the strands. Since the strands are generally circular or oval in section, they would not fall within the grooves if the sections of the grooves are smaller. The strands will be supported on and guided along the edge of any opening of the grooves. Therefore, sliding of the strands in a lateral direction is suppressed so that the zig-zag movement of the strands can be easily prevented.

A leap preventing member 8 is disposed above the guide portion 7e so that it partially enters into the groove of the guide portion 7e and to cover the bottom 7d as shown in FIGS. 1 and 7. The leap preventing member 8 will be brought into contact with the upper surface of the strands conveyed within the groove of the guide portion 7e at the bottom portion 8a thereof to prevent the strands from leaping.

An example of the leap preventing member 8 which is used in the present embodiment is shown in FIGS. 9A, 10 to 13. In other words, the leap preventing member 8 has a shape in section which is substantially similar to the planar shape of the guide portion 7e so that the bottom portion thereof will be adapted into the groove of the guide portion 7e. The leap preventing member 8 has a substantially triangle shape in section. This causes it to be moved away from an upper roller 1 of the take up rollers D so that it will not contact therewith.

Figure 21:
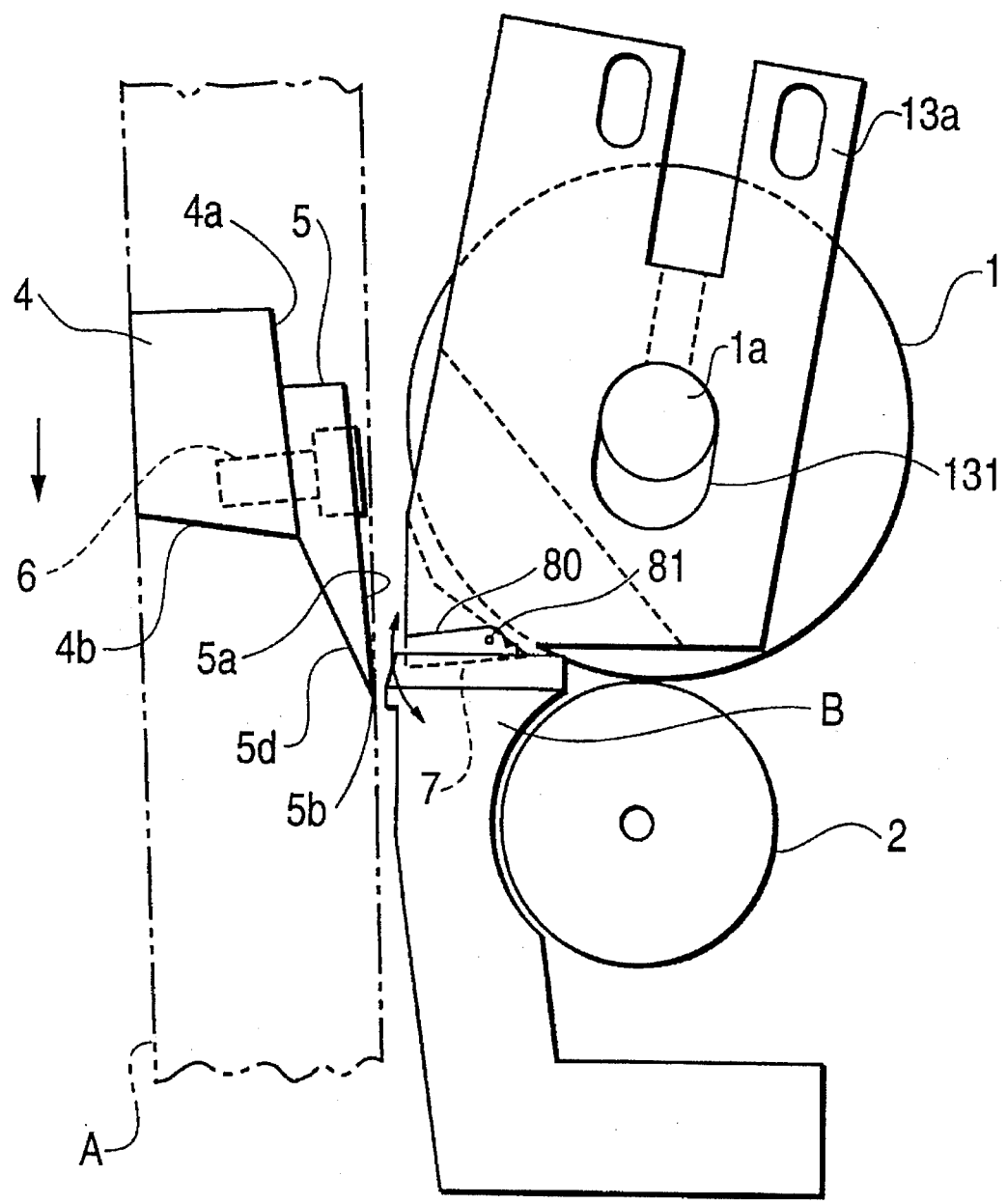
FIG. 21 is a side view showing another example of mounting of the leap preventing member which may be used in the present invention.
Figure 22:
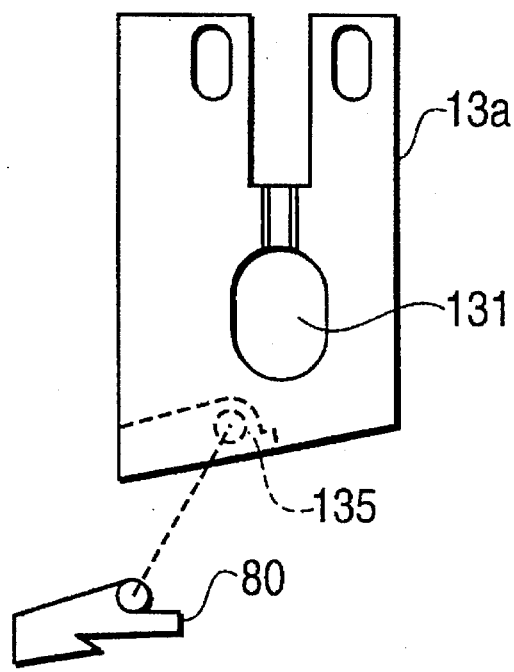
FIG. 22 is an explanatory view showing the mounting structure of the leap preventing member shown in FIG. 21.
Figure 23:
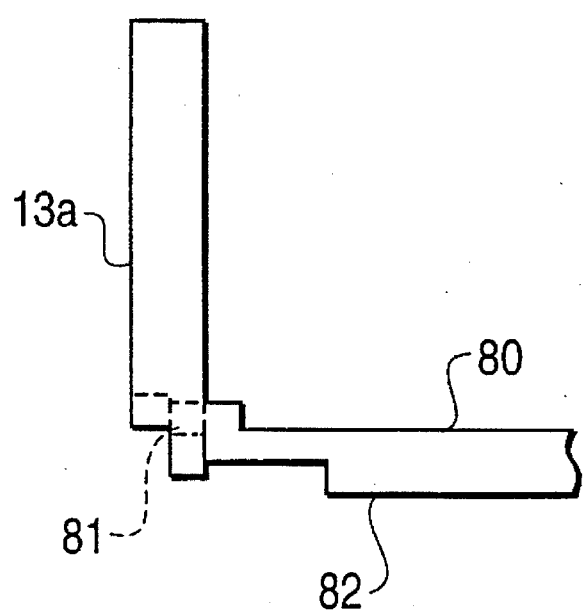
FIG. 23 is a partial front view showing the above mentioned mounting.
Figure 24:
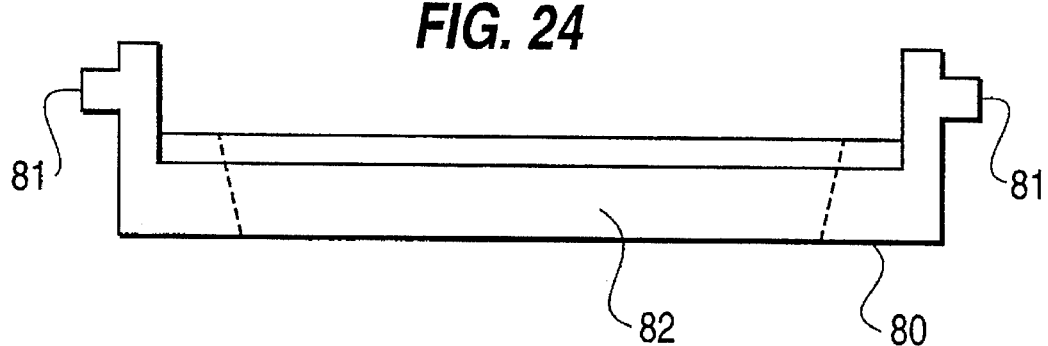
FIG. 24 is a plan view showing the leap preventing member shown in FIG. 22 and 23.
Figure 25:
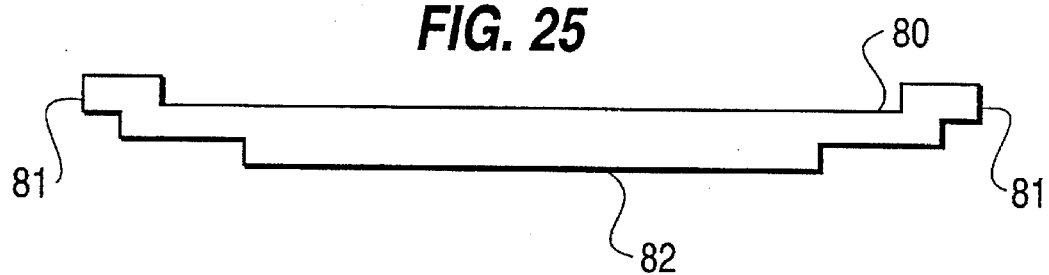
FIG. 25 is a front view of the leap preventing member shown in FIG. 24.
Figure 26:
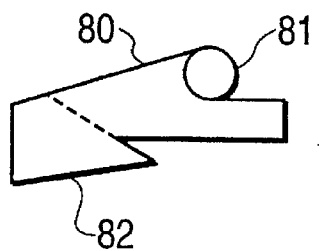
FIG. 26 is a side view of FIG. 25.

The leap preventing member 8 has arm portions 16a and 16b at the opposite ends thereof for supporting itself. The arm portions 16a and 16b have threaded holes 161 and 162 respectively. They are mounted on the supporting members 13a and 13b by means of the bolts 17 screwed into the threaded holes 161 and 162, respectively (refer to FIGS. 8 and 11–13). The supporting members 13a and 13b are provided with elongated holes 131 (see FIGS. 1 and 21) each having such a flexibility so that they can be offset from a shaft 1a of the take up rollers D which will be described hereafter. This flexibility is determined to absorb the variation in dimension in a height direction due to variations in diameter of the strands to be cut, curvature, deformation in section, etc. Accordingly, the lead preventing member 8 performs a function to absorb the variations in a height direction and to bias the strands by its own weight.

The upper roller 1 of the take up rollers D, which will be described hereafter includes an apparatus (pneumatic actuator 150: refer to FIG. 8) for adjusting the contact pressure by elevating or lowering the upper roller 1 to provide an optimum contact pressure depending upon the diameter of the strands. Therefore, the upper roller 1 is moved in a vertical direction with respect to the lower roller 2. At this time, the leap preventing member 8 is interlocked with the vertical movement of the upper roller 1 since the shaft 1a of the upper roller 1 extends through the supporting members 13a and 13b.

Figure 18:
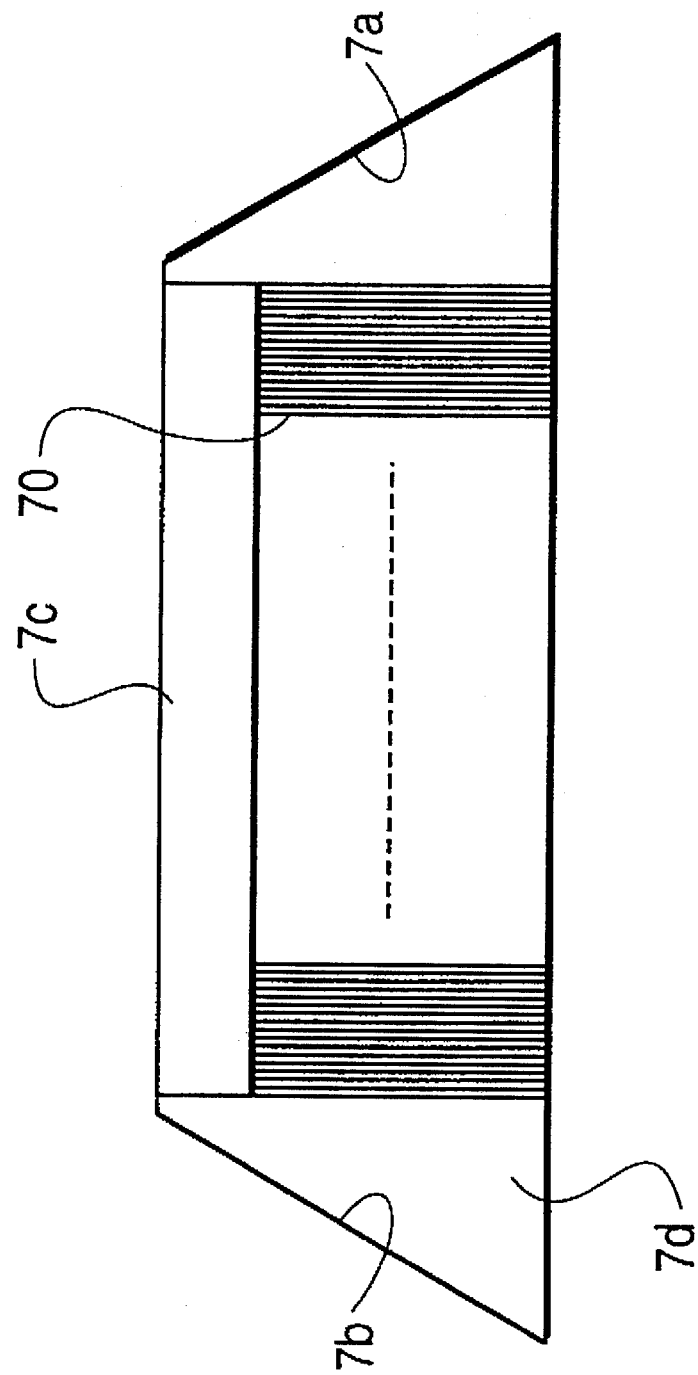
FIG. 18 is a plan view showing an example of grooves provided on the bottom of the guide portion of the stationary blade unit.

The bottom portion 8a of the leap preventing member 8 may be provided with grooves similar to the grooves 70 shown in FIG. 18 on the bottom side thereof. Similar advantages as mentioned above can be obtained by providing these grooves. Providing of the grooves 70 on both the bottom sides of the bottom portion 7d of the guide portion 7e and the bottom portion 8a of the leap preventing member 8 is more advantageous.

The leap preventing member 8 is not limited to only the structure illustrated and described above. For example, the side of the stationary blade 7c may be pivotable instead of the leap preventing member 8. Specifically the leap preventing member 80 shown in FIG. 21 may be a structure as shown in FIGS. 22 to 26. In other words, the leap preventing member 80 includes shafts 81 which are inserted into bearing holes 135 formed in the supporting members 13 and a fitting portion 82 which is fitted into the guide portion 7e.

The leap preventing member 80 has the shafts 81 which are pivotally supported in the bearing holes 135. Accordingly, the leap preventing member 80 is pivotal around the shafts 81. Even if the strands leap locally, pivotal movement of the member 80 would absorb such movement.

The interlocking relationship of the leap preventing member 80 with the supporting member 13 and with the upper roller 1 is similar to that of the above mentioned leap preventing member 8.

Figure 27:
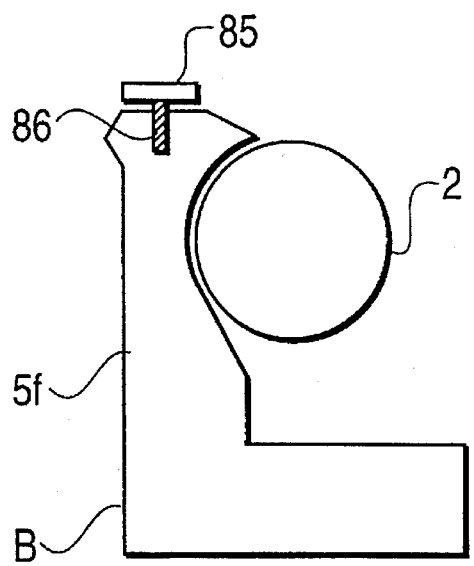
FIG. 27 is an explanatory view showing another example of the leap preventing member.
Figure 28:
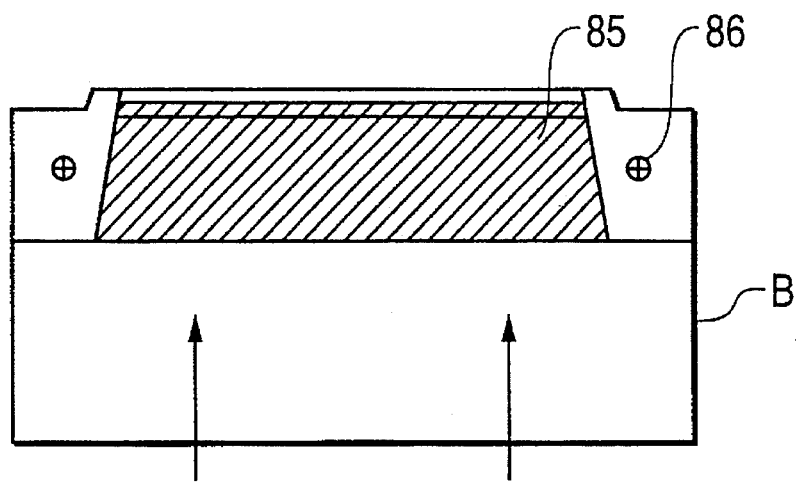
FIG. 28 is a plan view showing the leap preventing member shown in FIG. 27.

Alternatively, the leap preventing member may be of another structure. A leap preventing member 85 shown in FIGS. 27 and 28 is secured to the platen 5f of the stationary blade unit B by means of bolts 86. The spacing between the leap preventing member and the bottom portion of the guide portion 5e can be adjusted by adjusting the fastening of the bolts 86 in this case. Hatching in FIG. 28 denotes the position of the grooves of the guide portion 5e below the leap preventing member 85.

Since the leap preventing member 85 in this case can bias the strands with a large force, it is preferable for the strand to have a high rigidity.

As shown in FIGS. 1, 7, 8 and 9A, the take up rollers D comprises upper and lower rollers 1 and 2, pivotal members 14a and 14b which bear the shaft 1a of the upper roller 1, connecting rods 15a and 15b which are connected with the pivotal members 14a and 14b, respectively and pneumatic actuators 150 which are linked with the pivotal members 14a and 14b through the connecting rods 15a and 15b.

The lower roller 2 is provided with a pulley (not shown). Torque of the motor 24 is transmitted to the pulley via the previously mentioned belt 242 shown in FIG. 14 so that the lower roller 2 is driven to rotate. The upper roller 1 is in contact with the lower roller 2 so that the former is driven by the latter. Alternatively, the upper roller 1 may drive the lower roller 2.

In the present embodiment, the upper and lower rollers 1 and 2 are coated with rubber on the surface thereof. Alternatively, only one of the rollers 1 and 2 may be coated with rubber on the surface thereof.

Figure 19A:
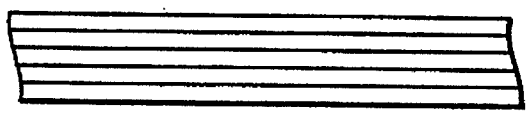
FIG. 19A is a partial plan view showing an example of a concave and convex pattern which may be provided on the surface of each roller of the take up roller.
Figure 19B:
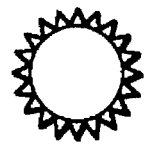
FIG. 19B is a side view showing the above mentioned pattern.
Figure 20:
FIG. 20 is a partial plan view showing another example of the concave and convex pattern which may be provided on the surface of each roller of the take up roller.

Alternatively, at least one of the upper and lower rollers 1 and 2 may be formed with concave and convex patterns as shown in FIGS. 19A and 19B or FIG. 20. The pattern shown in FIG. 19A has convex portions which extend in an axial direction and is preferable to convey hard strands without slippage. On the other hand, the pattern shown in FIG. 20 is a meshed pattern which is preferable to convey soft strands without abrasion.

Now, operation of the strand cutting machine in the present embodiment will be described.

Firstly, installation of the machine will be described. The machine is generally installed in a horizontal position. It is preferable to incline the machine for positively cutting soft resin strands. In other words, the heights of the rotary blade assembly A, the stationary blade unit B and the take up rollers D are adjusted by the adjusters 32 and 33 shown in FIG. 14 so that the strands from the take up rollers D are conveyed in such an inclined manner that the levels of the strands S are higher and lower on the sides of the take up rollers D and the rotary blade assembly A, respectively. This enables the strands S to be supplied toward the rotary blade 5 and to be cut while the level of the cutting position of the strands S by the rotary blade 5 is always lower than that of the position where they are conveyed from the take up rollers D.

In such a manner, at least one strand to be cut is taken up by the take up rollers D and is conveyed by a predetermined conveying length toward the stationary blade 7c. The rotary blades 5 are rotated to reach the position of the stationary blade 7c at intervals of a predetermined period for cutting the conveyed strand S between the rotary and stationary blades 5 and 7c. This causes the strands to be cut so that pellets are manufactured.

Figure 29:
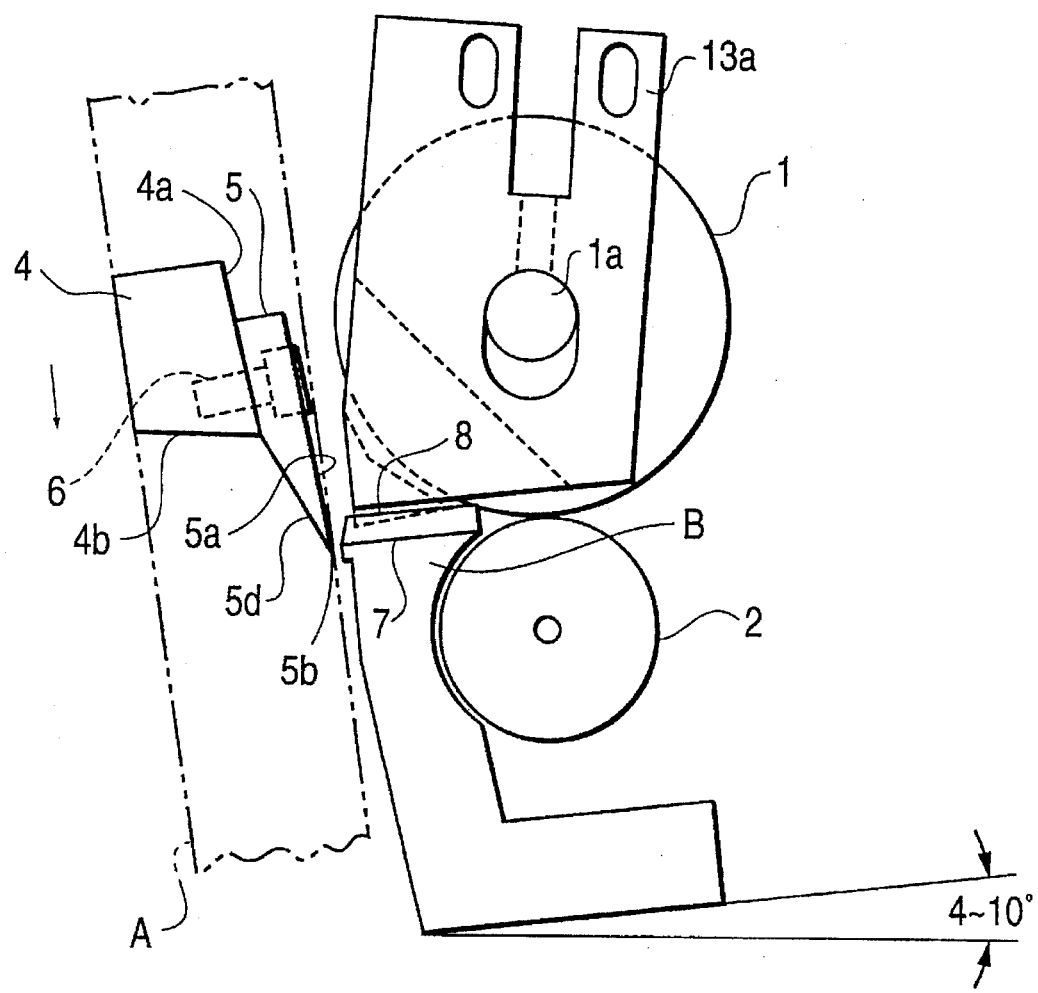
FIG. 29 is a side view showing how cutting of strands is performed by the strand cutting machine of the present invention.

The inclined position is illustrated in FIG. 29. As shown in the drawing, the inclination angle is preset in the range of 4 to 10 degrees. The angle is made larger for strands having softer properties. Unqualified cutting of the soft strands can be suppressed by inclining the machine. Particularly, an unqualified condition, in which a plurality of incompletely cut segments are continuous, can be prevented. The reason why the unqualified cutting can be prevented by the inclination of the machine is not clear. However, the reason can be considered to be as follows:

The above mentioned adjustment of the height presets the level at which the strands are conveyed by the take up roller to be higher than the level of the stationary blade in a vertical plane in accordance with option relation between the take up roller for conveying the strands and the stationary and rotary blades for cutting the conveyed strands. As a result of this, the inclination causes the strands to be smoothly conveyed. Accordingly, since escapement of the strands in the retracting direction between the rotary and stationary blades in suppressed, cutting is positively achieved.

In such a manner, it is preferable to incline the strand conveying portion for cutting the strands. The inclination angle may be larger than 10 degrees for soft strands. Since it is better not to incline the machine at an excessive angle to cut hard strands, it is preferable to incline the machine at 10 degrees at most to cut both soft and hard strands without changing the inclination angle.

Figure 30:
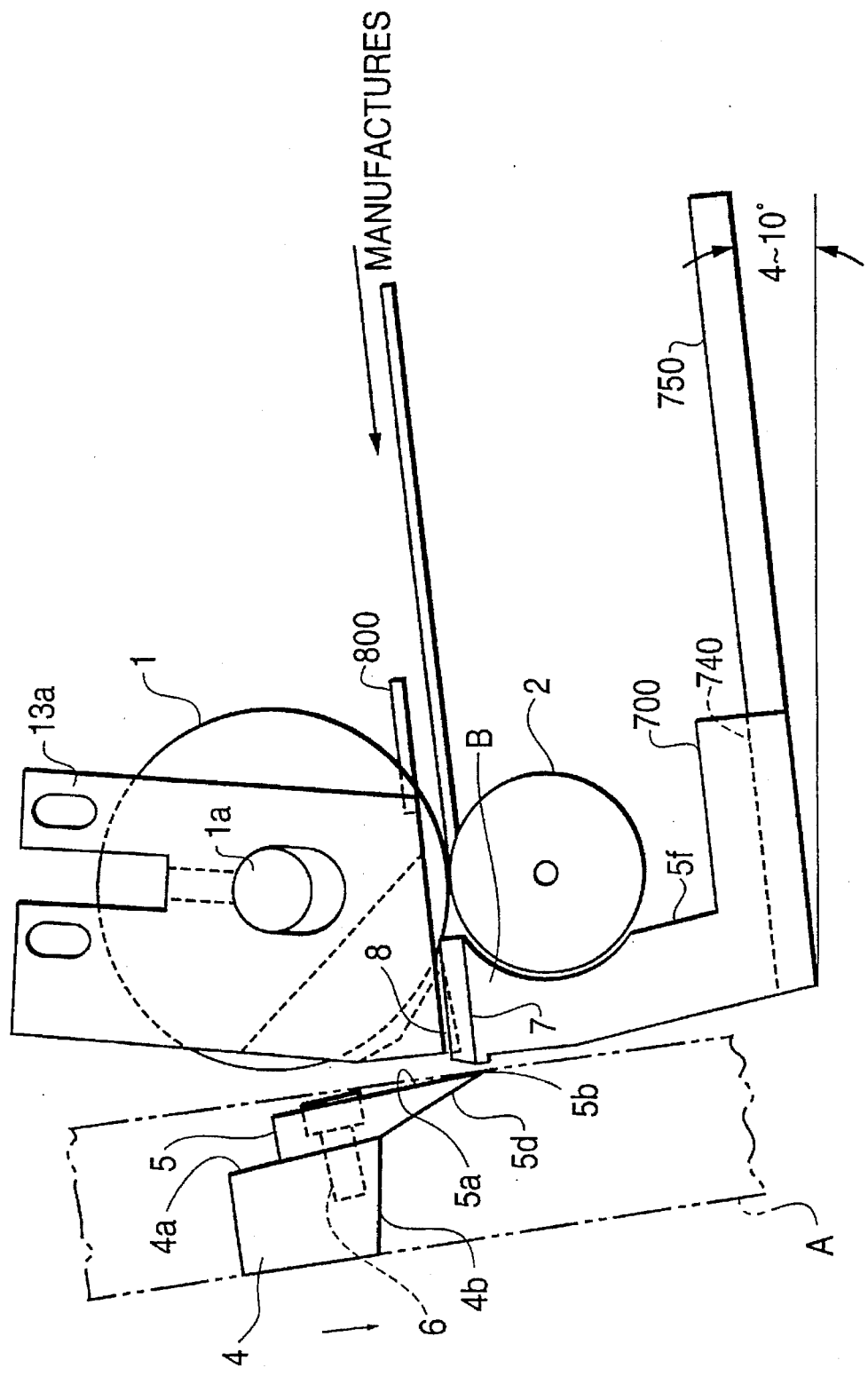
FIG. 30 is a side view showing main parts of the strand cutting machine of the present invention, in which the rotary blade assembly, the stationary blade unit and the take up roller are inclined and accommodated in the housing.

The cutting machine per se can be preliminarily inclined without performing adjustment. An example of this is shown in FIG. 30. In this case, the rotary blade assembly A, the stationary blade unit B and the take up rollers D are mounted within the housing E so that they are inclined at the same angle with respect to the bottom of the housing E shown in FIG. 14. In the case of FIG. 30, the stationary blade unit B and the take up rollers D are mounted on a common mount 700, which is movably mounted on rails 750 provided on the bottom of the housing.

The rails 750 are preliminarily inclined at an angle in the range of 4 to 10 degrees as shown in FIG. 30. This can achieve the above mentioned positional relationship between the rotary blade assembly A, the stationary blade unit B and the take up rollers D.

Although inclination is achieved by the rails 750 in the case of FIG. 30, it is of course possible that the mount per se may be inclined without using rails.

The reason why the rails 750 are used is that there is an advantage that adjustment of the spacing between the rotary blade assembly A and the stationary blade unit B can be made independently of the positional relation between the stationary blade unit B and the take up rollers D. The parameter which requires such adjustment includes, for example, a change in distance between the rotary blade and the stationary blade due to wear.

In the example of FIG. 30, a strand converging member 800 for converging a plurality of strands which are conveyed by the take up rollers D into the width of the take up rollers D is provided on the take up side of the take up rollers D. This enables the plurality of strands to be smoothly taken up.

Figure 31:
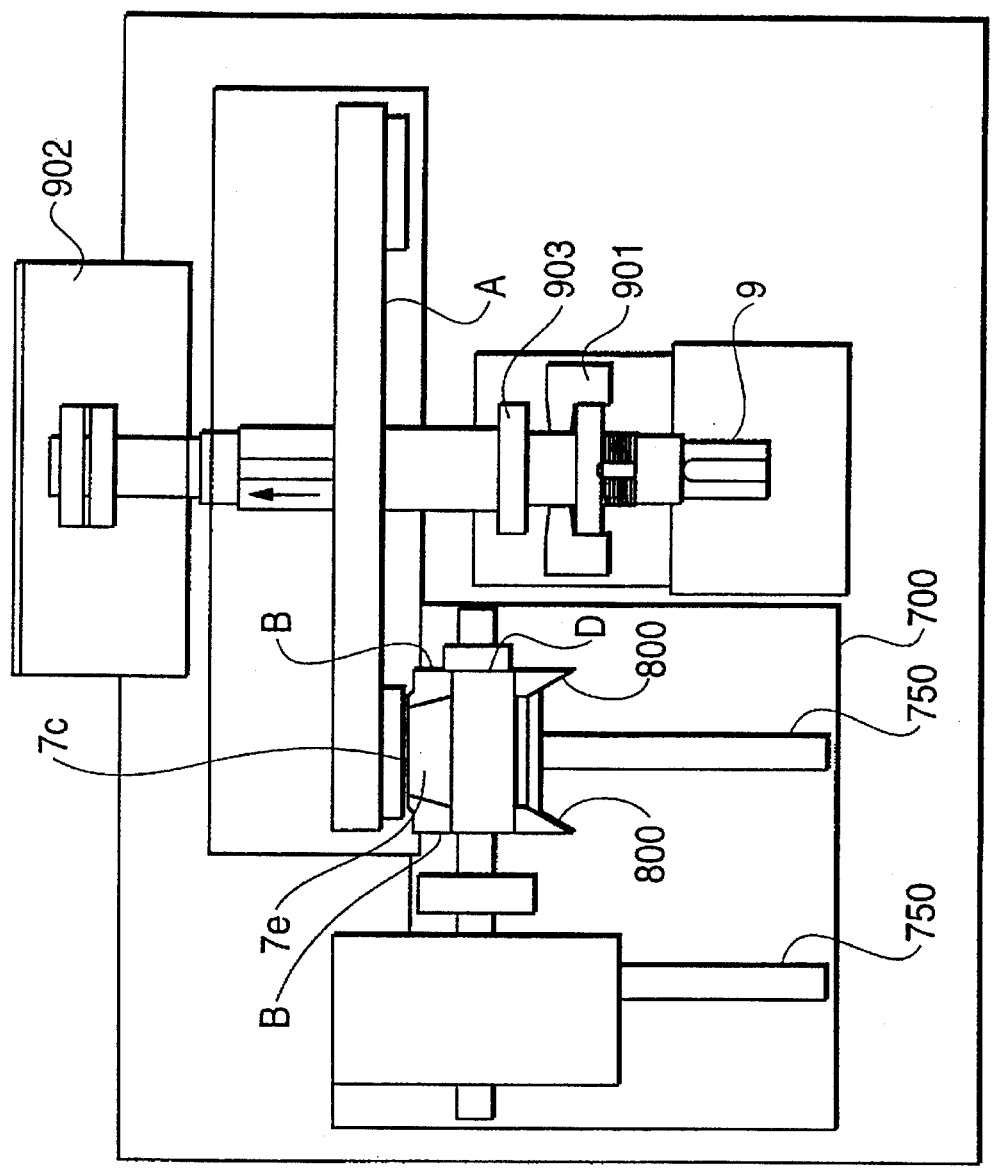
FIG. 31 is a plan view showing an example of the structure for canceling thermal expansion which can be adopted in the strand cutting machine of the present invention.

An arrangement which copes with the thermal expansion which occurs on cutting of high temperature strands will be described. This arrangement is applicable to the foregoing embodiment. One of the bearings for the rotary shaft, which allows the rotary shaft 9 to be axially displaced, is used. This bearing is shown as a bearing 902 in FIG. 31. On the other hand, the rotary shaft 9 is born by a bearing 901 which suppresses the axial displacement. Therefore, thermal expansion of the rotary shaft 9 will be absorbed by the bearing 902. Since the stationary blade unit B will thermally expand similarly, the displacement of the rotary blade assembly A will be canceled.

A further bearing 903 is provided in the vicinity of the stationary bearing in the present embodiment.

In such a manner, the strands can be smoothly cut by each blade plate 5 without the occurrence of abrasion between the blade edge 5b and the strands or the stationary blade unit B.

The blade edge face 5d will guide the front edges of the strands to be cut in a rotational direction. This enables the strands to be smoothly cut into pellets.

Since the blade plate 5 is mounted on the rotary blade supporting portion 4 by means of bolts 6 in such a manner that it is fitted into the front side 4a of the inclined rotary blade supporting portion 4 on the opposite side 5c thereof, the rotary blades 5 effectively achieve a cutting function without loosening of the bolts 6 and the blade plates 5.

The strands which are conveyed by both take up rollers 1 and 2 are guided between the guide portion 7e of the stationary blade unit B and the leap preventing plate 8 while being prevented from leaping and are effectively dispensed toward the rotary blade assembly A.

In accordance with the present invention, each blade plate 5 can be easily and adjustably mounted on each rotary blade supporting portion 4 of the rotary disc 3 from the front side of the rotary blade assembly A. Ease of mounting and adjusting of the blade plates 5 can be further enhanced. Each blade plate 5 smoothly cuts the strands which are guided by the cut shaped front edge face 5d into pellets without abrasion between the blade edge and the strands or the stationary blade unit B. This enhances the cutting ability of the strand cutting machine.

As mentioned above, inclination in the guide portion of the stationary blade unit B enables soft strands to be smoothly conveyed, resulting in reduction in unqualified cut strands.

What is claimed is:

1. A strand cutting machine for cutting at least one strand which is linearly formed, comprising a rotary blade assembly having a rotary shaft and a plurality of rotary blades which are radially disposed on and around said rotary shaft;

a stationary blade unit adjacent to said rotary blade assembly, having a guide portion for guiding said strand toward said rotary blades in an axial direction of the rotary shaft of said rotary blade assembly and a stationary blade disposed in front of the guide portion;

a take-up roller disposed on the side of the base end of the guide portion for taking up a strand;

a rotary blade assembly drive unit for driving said rotary blade assembly;

a take-up roller drive unit for driving said take up roller;

a stand on which are mounted the stationary blade unit, the take up roller and the take up roller drive unit; and rails which support the stand thereon so that it is movable with respect to the rotary blade assembly in the axial direction of the rotary shaft of the rotary blade assembly.

2. A strand cutting machine as defined in claim 1 in which said rotary blade assembly, said stationary blade unit and said take up roller are disposed in such a positional relationship that the strand conveyed from the take up roller to the rotary blade assembly is inclined with respect to horizontal with a downstream end of the strand being higher than an upstream end.

3. A strand cutting machine as defined in claim 2 in which said rotary blade assembly, said stationary blade unit and said take up roller are disposed in such a manner that said conveyed strand is inclined at not less than 4 degrees and not higher than 10 degrees with respect to the horizontal surface.

4. A strand cutting machine as defined in claim 2, in which said stationary blade unit has the guide portion which is inclined so that a side of the guide portion on which the stationary blade, is provided is the lowest.

5. A strand cutting machine as defined in claim 4 in which said guide portion is inclined at not less than 4 degrees and not higher than 10 degrees with respect to the horizontal surface.

6. A strand cutting machine as defined in claim 1 in which each of the rotary blades is comprised of a blade plate having a blade edge on one end thereof;

the rotary blades having the blade edges which are in the closest proximity of the stationary blade and located on the same rotary plane and radially disposed on and around the rotary shaft by being inclined in such a manner that the plate becomes far from the stationary blade in a direction from the blade edge to the base end.

7. A strand cutting machine for cutting at least one strand which is linearly formed, comprising at least:

a rotary blade assembly having a rotary shaft by which it is driven around and a plurality of rotary blades which are radially disposed on and around the rotary shaft;

a stationary blade unit adjacent to the rotary blade assembly, having a guide portion for guiding the strand toward the rotary blades in an axial direction of the rotary shaft of the rotary blade assembly and a stationary blade which is disposed in front of the guide portion;

in which the rotary blade assembly further includes, radially disposed on and around the rotary shaft, a plurality of rotary blade supporting portions for supporting the rotary blades and a link for reinforcing the rotary blade supporting portions by linking them to each other;

the link being in the form of ring and having an inner diameter which becomes larger in a direction remote from the rotary blades.

8. A strand cutting machine as defined in claim 7, in which said blade supporting portions comprise a plurality of blade plates each having a blade edge, wherein each blade plate is fixed to the rotary blade supporting portions of the rotary blade assembly with the blade edges on the said rotary plane.

9. A strand cutting machine as defined in claim 8 in which:

said rotary blade assembly further includes a bolt for fixing said blade plate;

each of said blade plates have a mounting portion;

said mounting portion includes a slit hole which is elongated from the base end of the blade plate to the front end thereof; and each blade plate is fixed to said rotary blade supporting portion by inserting said bolt into the slit hole.

10. A strand cutting machine as defined in claim 8 in which said mounting portion includes a notch extending from the base end of the blade plate to the substantially central portion thereof, into which the front end of said bolt can be inserted.

11. A strand cutting machine as defined in claim 1 in which said take up roller includes upper and lower rollers which are in contact with each other.

12. A strand cutting machine as defined in claim 11 in which said guide portion includes a bottom, side walls and a leap preventing member above the bottom for preventing the strand from leaping.

13. A strand cutting machine as defined in claim 12 in which said leap preventing member is moved in a vertical direction in association with a rotary shaft of said upper roller.

14. A strand cutting machine as defined in claim 12 in which said leap preventing member has an end portion close to the take up roller which is pivotally supported so that the other end close to the stationary blade is pivotal.

15. A strand cutting machine as defined in claim 12 in which said leap preventing member is supported in an opening of the guide portion so that the spacing between the bottom of the member and the bottom of the guide portion is adjustable.

16. A strand cutting machine as defined in claim 1 in which said guide portion includes a bottom, and side walls opposite each other which are disposed so that the spacing between the side walls becomes narrower in a direction toward the stationary blade.

17. A strand cutting machine as defined in claim 16 in which the opposing side walls of said guide portion allow a plurality of strands to be conveyed in a parallel relationship in the narrowest position.

18. A strand cutting machine as defined in claim 17 in which said guide portion is provided on the bottom thereof with a plurality of grooves for guiding the strands.

19. A strand cutting machine as defined in claim 12 in which said leap preventing member is provided on the bottom thereof with a plurality of grooves for guiding the strands.

20. A strand cutting machine as defined in claim 17, further including a strand converging portion adjacent to the upstream side of said take up roller where the strands are taken up, for converging the plurality of strands taken up by said take up roller into an area with the width of the take up roller.

21. A strand cutting machine as defined in claim 1, wherein said rotary blade assembly includes a first bearing on the side of one end of the rotary shaft of said rotary blade assembly for bearing said rotary shaft while it is not axially movable and, a second bearing on the side of the other end of the rotary shaft for bearing said rotary shaft while it is axially movable.

22. A strand cutting machine as defined in claim 1, in which said rotary blade assembly further includes a link for reinforcing said rotary blade supporting portion.

23. A strand cutting machine as defined in claim 22 in which said link is in the form of a ring and has an inner diameter which becomes larger in a direction remote from the rotary blades.

24. A strand cutting machine as defined in claim 1 in which said take up roller has a concave and convex pattern on the surface thereof.

25. A strand cutting machine as defined in claim 24 in which the pattern of said take up roller is a meshed pattern.

26. A strand cutting machine as defined in claim 24 in which the pattern of said take up roller is a concave pattern, each concave portion extending in an axial direction of said roller.

27. A strand cutting machine for cutting at least one strand, which is linearly formed, comprising a rotary blade assembly having a rotary shaft and a plurality of rotary blades which are radially disposed on and around said rotary shaft;

a stationary blade unit adjacent to said rotary blade assembly, having a guide portion for guiding said strand toward said rotary blades in an axial direction of the rotary shaft of said rotary blade assembly and a stationary blade;

a take-up roller disposed on the side of the base end of the guide portion for taking up the strand; and a rotary blade assembly drive unit for driving said rotary blade assembly;

wherein said rotary blade assembly includes a first bearing on the side of one end of the rotary shaft of said rotary blade assembly for bearing said rotary shaft while it is not axially movable and a second bearing on the side of the other end of the rotary shaft for bearing said rotary shaft while it is axially movable.

28. A strand cutting machine as defined in claim 27 in which said rotary blade assembly, said stationary blade unit and said take up roller are disposed in such a positional relationship that the strand conveyed from the take up roller to the rotary blade assembly is inclined with respect to horizontal with a downstream end of the strand being higher than an upstream end.

29. A strand cutting machine for cutting at least one strand, which is linearly formed, comprising a rotary blade assembly having a rotary shaft and a plurality of rotary blades which are radially disposed on and around said rotary shaft;

a stationary blade unit adjacent to said rotary blade assembly, having a guide portion for guiding said strand toward said rotary blades in an axial direction of the rotary shaft of said rotary blade assembly and a stationary blade;

a take-up roller disposed on the side of the base end of the guide portion for taking up the strand; and a rotary blade assembly drive unit for driving said rotary blade assembly;

in which said guide portion is provided on the bottom thereof with a plurality of grooves for guiding the strands, each groove having a width smaller than the width of the strands.

30. A strand cutting machine for cutting at least one strand, which is linearly formed, comprising a rotary blade assembly having a rotary shaft and a plurality of rotary blades which are radially disposed on and around said rotary shaft;

a stationary blade unit adjacent to said rotary blade assembly, having a guide portion for guiding said strand toward said rotary blades in an axial direction of the rotary shaft of said rotary blade assembly and a stationary blade;

a take-up roller disposed on the side of the base end of the guide portion for taking up the strand; and a rotary blade assembly drive unit for driving said rotary blade assembly;

in which each of the rotary blades is constituted of a blade plate having a blade edge on one end thereof;

each blade plate is radially disposed around the rotary shaft in a condition where an edge formed by the blade edges are in the closest proximity to the stationary blade to be located on the same virtual rotary plane and the portions other than the edge are in a condition retreated from the stationary blade in a direction away from the blade edge to form an acute angle of about 5 degrees between the virtual plane.

31. A strand cutting machine as defined in claim 30 in which said blade plate has an inclined face on the sides which forms an acute angle between the stationary blade which is inclined at about 50 to 65 degrees with respect to a plane perpendicular to said virtual rotary plane.

* * * * *